United States Patent
Patel

(10) Patent No.: US 8,315,742 B2
(45) Date of Patent: Nov. 20, 2012

(54) SYSTEM AND METHOD OF LOADFLOW CALCULATION FOR ELECTRICAL POWER SYSTEM

(76) Inventor: Sureshchandra Patel, Toronto (CA)

( * ) Notice: Subject to any disclaimer, the term of this patent is extended or adjusted under 35 U.S.C. 154(b) by 0 days.

(21) Appl. No.: 12/310,433

(22) PCT Filed: Aug. 27, 2007

(86) PCT No.: PCT/CA2007/001537
§ 371 (c)(1),
(2), (4) Date: Feb. 24, 2009

(87) PCT Pub. No.: WO2008/025162
PCT Pub. Date: Mar. 6, 2008

(65) Prior Publication Data
US 2012/0089264 A1   Apr. 12, 2012

(51) Int. Cl.
G05D 3/12    (2006.01)
G05D 5/00    (2006.01)
G05D 9/00    (2006.01)
G05D 11/00   (2006.01)
G05D 17/00   (2006.01)

(52) U.S. Cl. ........ 700/286; 700/291; 700/295; 700/297; 700/298

(58) Field of Classification Search ............... 700/286, 700/291, 295, 297, 298
See application file for complete search history.

(56) References Cited

U.S. PATENT DOCUMENTS 7,519,506 B2 * 4/2009 Trias .................. 702/182
2004/0158417 A1 * 8/2004 Bonet .................. 702/57

* cited by examiner

Primary Examiner — Ronald Hartman, Jr.

(57) ABSTRACT

A method of performing loadflow computations for controlling voltages and power flow in a power network by reading on-line data of given/specified/scheduled/set network variables/parameters and using control means, so that no component of the power network is overloaded as well as there is no over/under voltage at any nodes in the network following a small or large disturbances. A loadflow computation method could be any method including invented Patel Decoupled Loadflow (PDL) method, and Decoupled Gauss-Seidel-Patel Loadflow (DGSPL) method. The invented Patel Decoupled Loadflow (PDL) calculation method is characterized in 1) the use of the same coefficient matrix [GB] for both the p-f and q-e sub-problems of the loadflow computation; 2) almost no effort in the modified mismatch calculations in the iteration process; and 3) all the nodes in both the sub-problems being active, no refactorization of [GB] required for implementation of Q-limit violations. These features make the invented PDL method computationally almost two times more efficient than the current state-of-the-art Super Super Decoupled Loadflow (SSDL) method. The invented DGSPL calculation method is characterized in decoupling the calculation of real and imaginary components of complex node voltage leading to increased stability and efficiency of the DGSPL calculation method.

3 Claims, 8 Drawing Sheets

Invention: flow-chart of Decoupled Gauss-Seidel-Patel Loadflow (DGSPL)
Method [given for (Jf, Je) iteration scheme-3: ITRF]

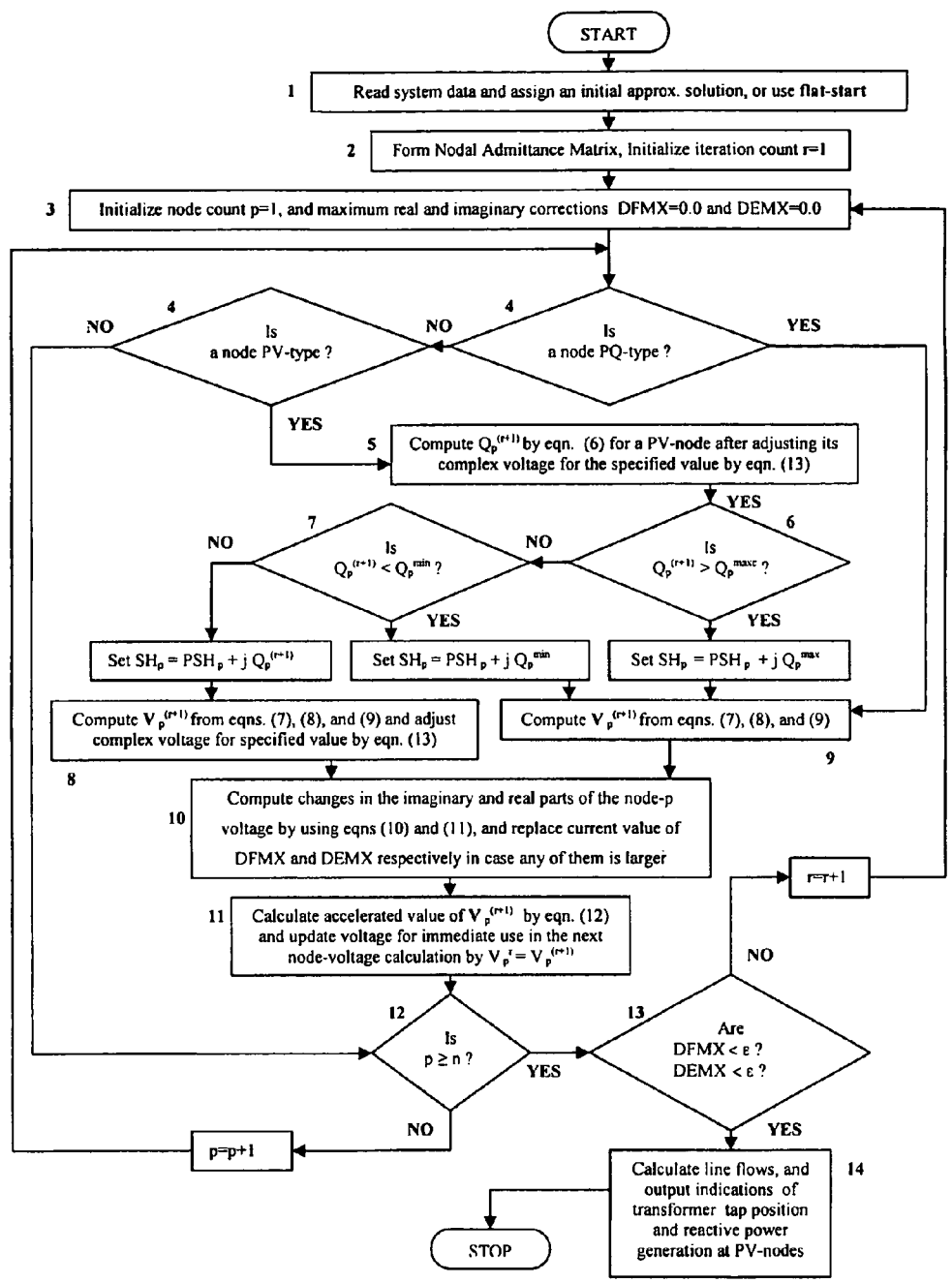
Fig.1a: Prior Art: flow-chart of Gauss-Seidel-Patel Loadflow (GSPL) Method

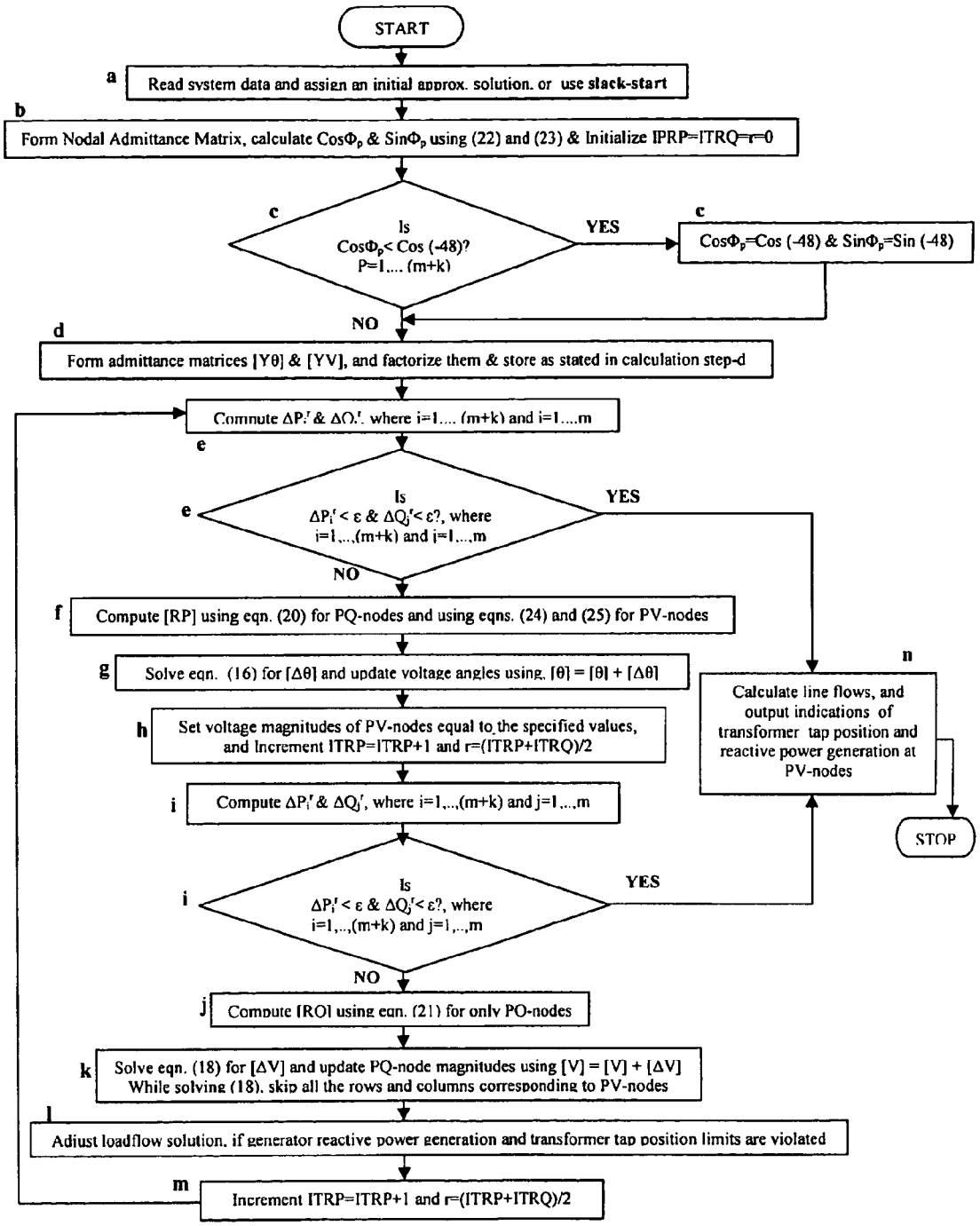
Fig.1b: Prior Art: Flow-chart: Super Super Decoupled Loadflow (SSDL) Method

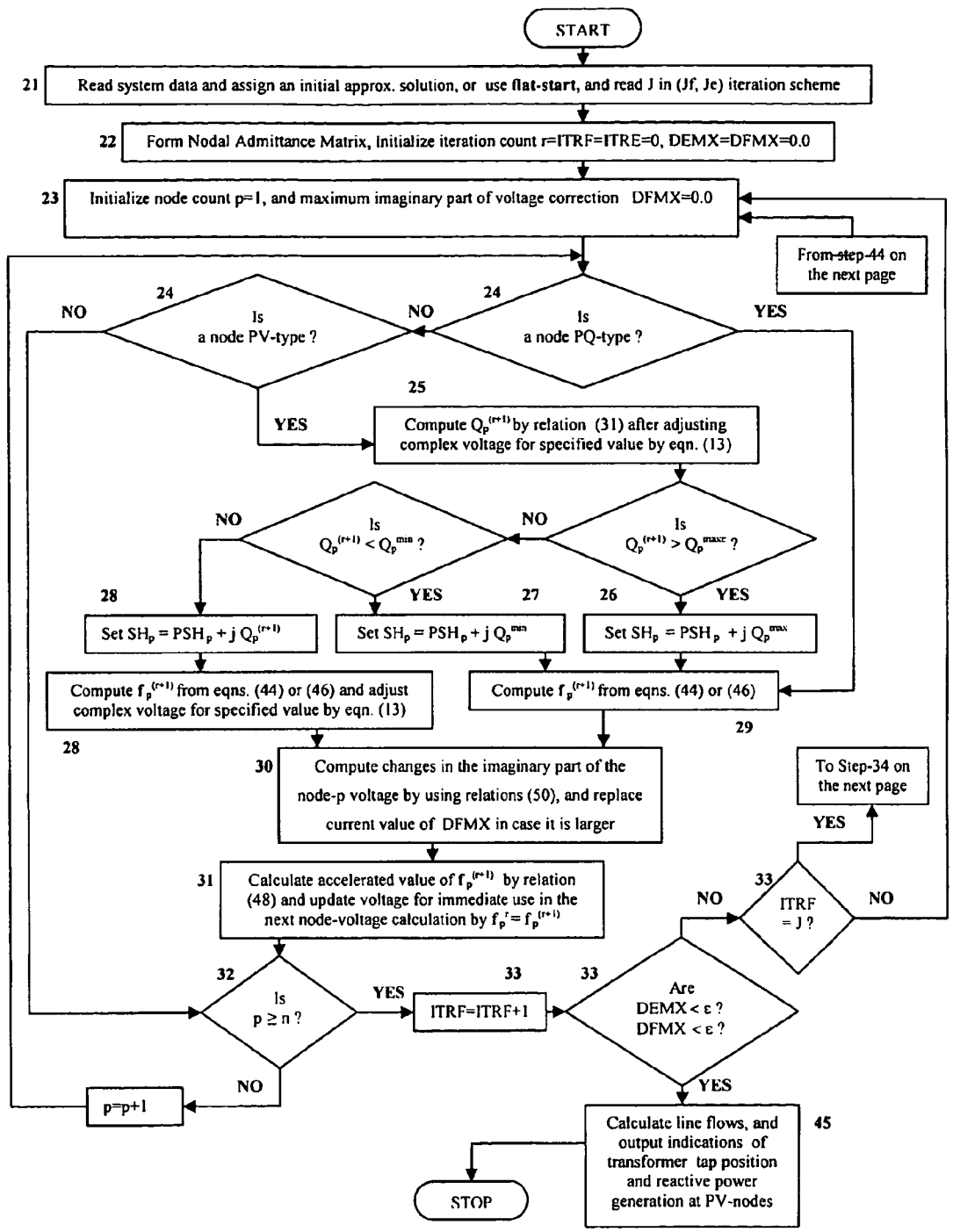
Fig. 2a: Invention: flow-chart of Decoupled Gauss-Seidel-Patel Loadflow (DGSPL) Method [given for (Jf, Je) iteration scheme-3: ITRF]

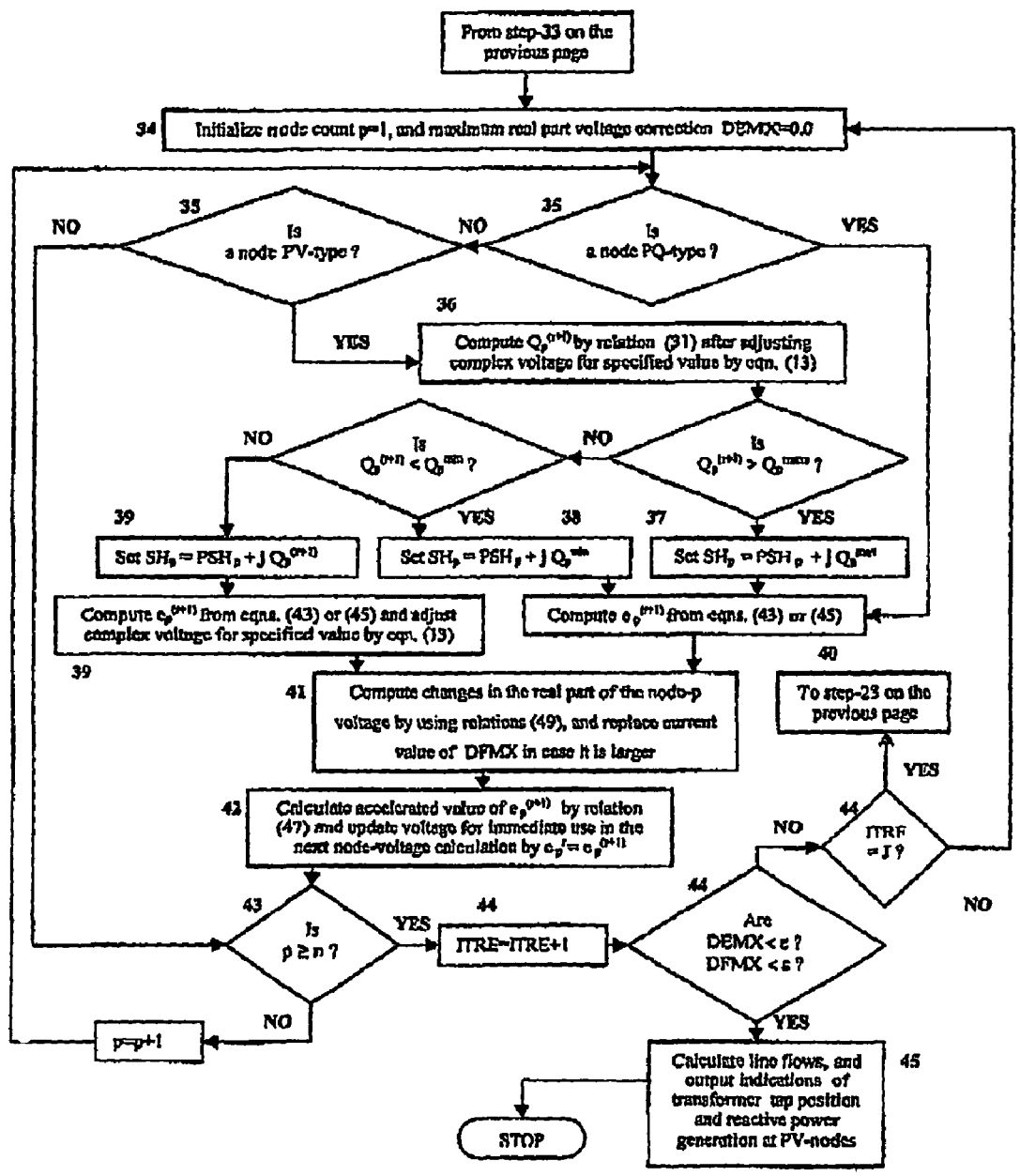
Fig. 2a: Invention: flow-chart of Decoupled Gauss-Seidel-Patel Loadflow (DGSPL) Method [given for (Jf, Je) iteration scheme-3: ITRE]

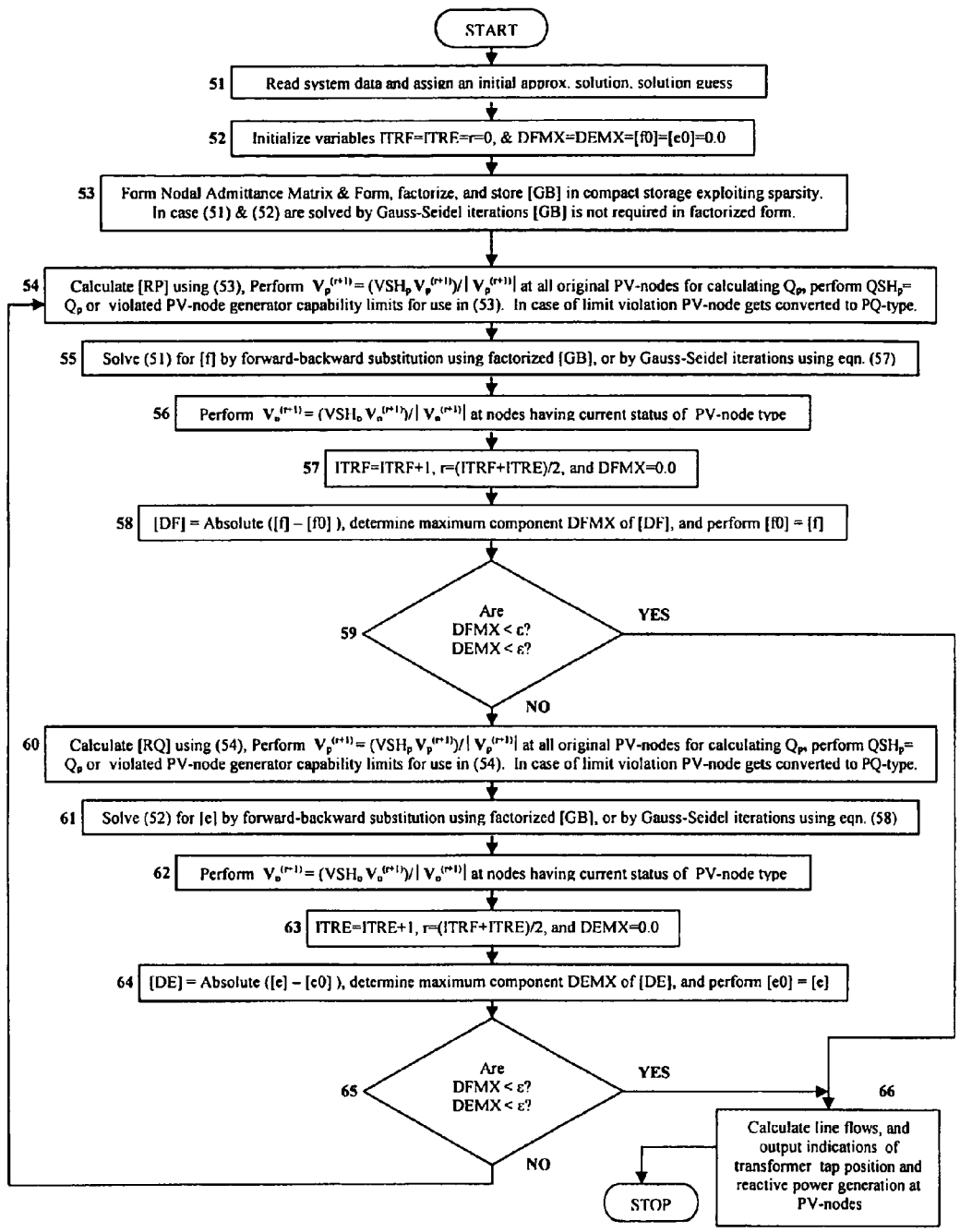
Fig.2b: Invention: Flow-chart of Patel Decoupled Loadflow (PDL) Method

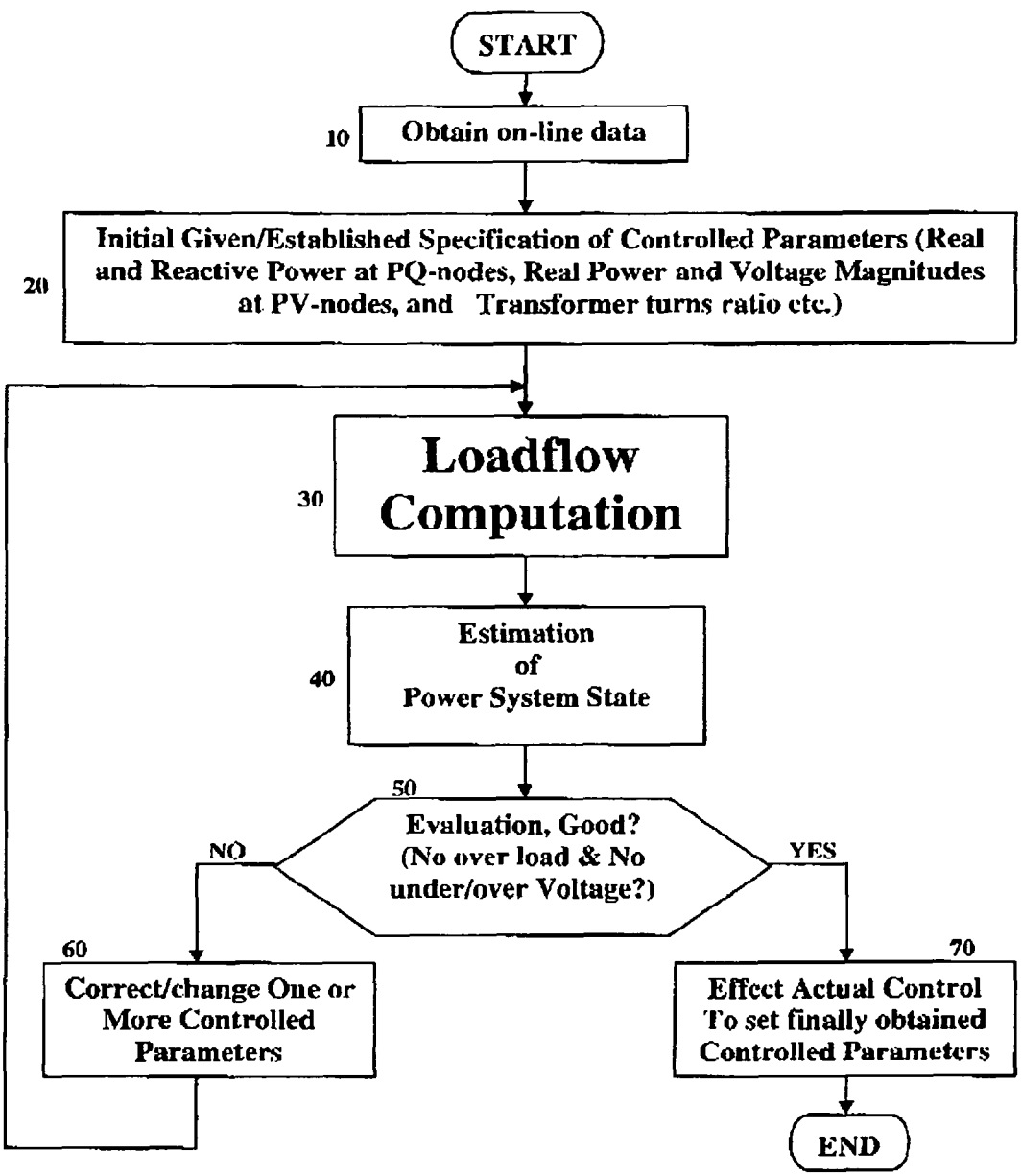
Fig. 3: Loadflow Computation in Power Flow Control and/or Voltage Control in Electrical Power System

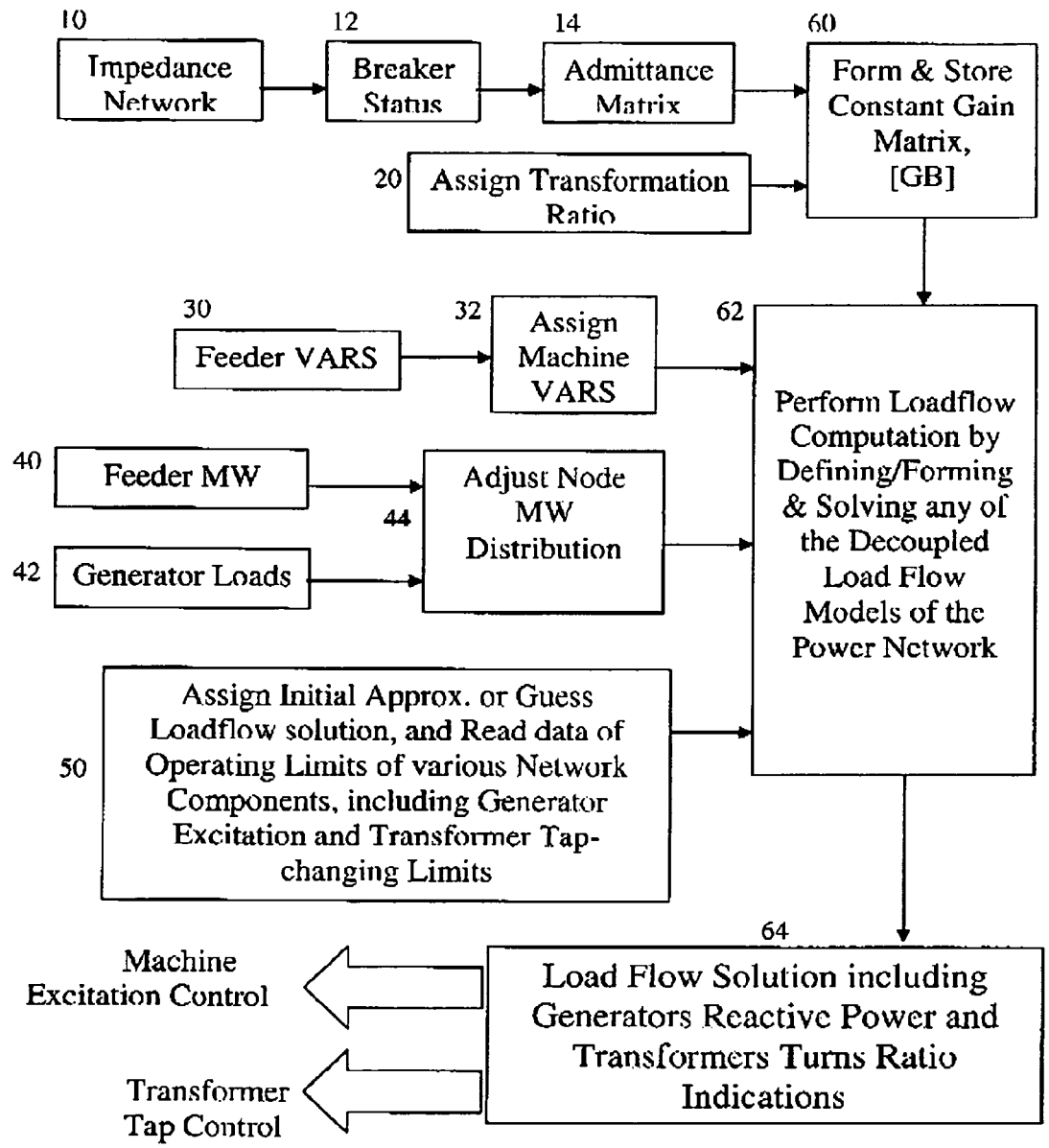
Fig. 4: Loadflow Computation for Voltage Control in Electrical Power System

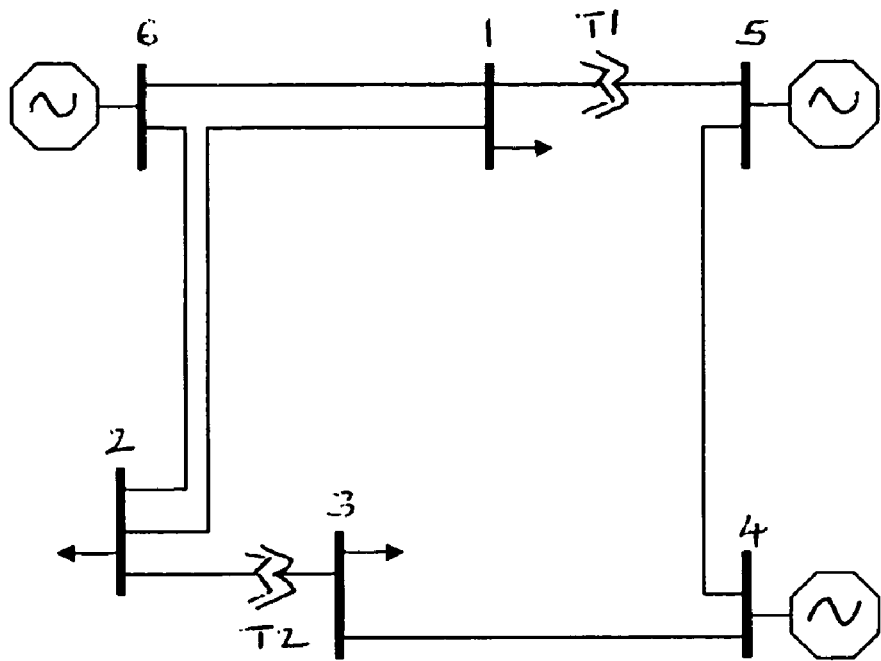
Fig. 5: An Exemplary 6-node Power System
Nodes: 1, 2, 3 are PQ-nodes
Nodes: 4 and 5 are PV-nodes
Nodes: 6 is the slack/swing/reference node
Transformers T1 and T2 are tap-changing

SYSTEM AND METHOD OF LOADFLOW CALCULATION FOR ELECTRICAL POWER SYSTEM

TECHNICAL FIELD

The present invention relates to methods of loadflow computation in power flow control and voltage control in an electrical power system.

BACKGROUND OF THE INVENTION

The present invention relates to power-flow/voltage control in utility/industrial power networks of the types including many power plants/generators interconnected through transmission/distribution lines to other loads and motors. Each of these components of the power network is protected against unhealthy or alternatively faulty, over/under voltage, and/or over loaded damaging operating conditions. Such a protection is automatic and operates without the consent of power network operator, and takes an unhealthy component out of service by disconnecting it from the network. The time domain of operation of the protection is of the order of milliseconds.

The purpose of a utility/industrial power network is to meet the electricity demands of its various consumers 24-hours a day, 7-days a week while maintaining the quality of electricity supply. The quality of electricity supply means the consumer demands be met at specified voltage and frequency levels without over loaded, under/over voltage operation of any of the power network components. The operation of a power network is different at different times due to changing consumer demands and development of any faulty/contingency situation. In other words healthy operating power network is constantly subjected to small and large disturbances. These disturbances could be consumer/operator initiated, or initiated by overload and under/over voltage alleviating functions collectively referred to as security control functions and various optimization functions such as economic operation and minimization of losses, or caused by a fault/contingency incident.

For example, a power network is operating healthy and meeting quality electricity needs of its consumers. A fault occurs on a line or a transformer or a generator which faulty component gets isolated from the rest of the healthy network by virtue of the automatic operation of its protection. Such a disturbance would cause a change in the pattern of power flows in the network, which can cause over loading of one or more of the other components and/or over/under voltage at one or more nodes in the rest of the network. This in turn can isolate one or more other components out of service by virtue of the operation of associated protection, which disturbance can trigger chain reaction disintegrating the power network.

Therefore, the most basic and integral part of all other functions including optimizations in power network operation and control is security control. Security control means controlling power flows so that no component of the network is over loaded and controlling voltages such that there is no over voltage or under voltage at any of the nodes in the network following a disturbance small or large. As is well known, controlling electric power flows include both controlling real power flows which is given in MWs, and controlling reactive power flows which is given in MVARs. Security control functions or alternatively overloads alleviation and over/under voltage alleviation functions can be realized through one or combination of more controls in the network. These involve control of power flow over tie line connecting other utility network, turbine steam/water/gas input control to control real power generated by each generator, load shedding function curtails load demands of consumers, excitation controls reactive power generated by individual generator which essentially controls generator terminal voltage, transformer taps control connected node voltage, switching in/out in capacitor/reactor banks controls reactive power at the connected node.

Control of an electrical power system involving power-flow control and voltage control commonly is performed according to a process shown in FIG. 5, which is a method of forming/defining and solving a loadflow computation model of a power network to affect control of voltages and power flows in a power system comprising the steps of:

Step-10: obtaining on-line/simulated data of open/close status of all switches and circuit breakers in the power network, and reading data of operating limits of components of the power network including maximum power carrying capability limits of transmission lines, transformers, and PV-node, a generator-node where Real-Power-P and Voltage-Magnitude-V are given/assigned/specified/set, maximum and minimum reactive power generation capability limits of generators, and transformers tap position limits, or stated alternatively in a single statement as reading operating limits of components of the power network, Step-20: obtaining on-line readings of given/assigned/specified/set Real-Power-P and Reactive-Power-Q at PQ-nodes, Real-Power-P and voltage-magnitude-V at PV-nodes, voltage magnitude and angle at a reference/slack node, and transformer turns ratios, wherein said on-line readings are the controlled variables/parameters, Step-30: performing loadflow computation to calculate, depending on loadflow computation model used, complex voltages or their real and imaginary components or voltage magnitude corrections and voltage angle corrections at nodes of the power network providing for calculation of power flow through different components of the power network, and to calculate reactive power generation and transformer tap-position indications, Step-40: evaluating the results of Loadflow Computation of step-30 for any over loaded power network components like transmission lines and transformers, and over/under voltages at different nodes in the power system, Step-50: if the system state is acceptable implying no over loaded transmission lines and transformers and no over/under voltages, the process branches to step-70, and if otherwise, then to step-60, Step-60: correcting one or more controlled variables/parameters set in step-20 or at later set by the previous process cycle step-60 and returns to step-30, Step-70: affecting a change in power flow through components of the power network and voltage magnitudes and angles at the nodes of the power network by actually implementing the finally obtained values of controlled variables/parameters after evaluating step finds a good power system or stated alternatively as the power network without any overloaded components and under/over voltages, which finally obtained controlled variables/parameters however are stored for acting upon fast in case a simulated event actually occurs or stated alternatively as actually implementing the corrected controlled variables/parameters to obtain secure/correct/acceptable operation of power system.

Overload and under/over voltage alleviation functions produce changes in controlled variables/parameters in step-60 of FIG. 3. In other words controlled variables/parameters are assigned or changed to the new values in step-60. This correction in controlled variables/parameters could be even optimized in case of simulation of all possible imaginable disturbances including outage of a line and loss of generation for corrective action stored and made readily available for acting upon in case the simulated disturbance actually occurs in the power network. In fact simulation of all possible imaginable disturbances is the modern practice because corrective actions need be taken before the operation of individual protection of the power network components.

It is obvious that loadflow computation consequently is performed many times in real-time operation and control environment and, therefore, efficient and high-speed loadflow computation is necessary to provide corrective control in the changing power system conditions including an outage or failure of any of the power network components. Moreover, the loadflow computation must be highly reliable to yield converged solution under a wide range of system operating conditions and network parameters. Failure to yield converged loadflow solution creates blind spot as to what exactly could be happening in the network leading to potentially damaging operational and control decisions/actions in capital-intensive power utilities.

The power system control process shown in FIG. 3 is very general and elaborate. It includes control of power-flows through network components and voltage control at network nodes. However, the control of voltage magnitude at connected nodes within reactive power generation capabilities of electrical machines including generators, synchronous motors, and capacitor/inductor banks, and within operating ranges of transformer taps is normally integral part of load flow calculation as described in "LTC Transformers and MVAR violations in the Fast Decoupled Load Flow, IEEE Trans., PAS-101, No. 9, PP. 3328-3332, September 1982." If under/over voltage still exists in the results of load flow calculation, other control actions, manual or automatic, may be taken in step-60 in the above and in FIG. 3. For example, under voltage can be alleviated by shedding some of the load connected.

The prior art and present invention are described using the following symbols and terms:

$Y_{pq}=G_{pq}+jB_{pq}$: (p-q)th element of nodal admittance matrix without shunts
$Y_{pp}=G_{pp}+jB_{pp}$: p-th diagonal element of nodal admittance matrix without shunts
$y_p=g_p+jb_p$: total shunt admittance at any node-p
$V_p=e_p+jf_p=V_p<\theta_p$: complex voltage of any node-p
$\Delta\theta_p, \Delta V_p$: voltage angle, magnitude corrections
$\Delta e_p, \Delta f_p$: real, imaginary components of voltage corrections
$P_p+jQ_p$: net nodal injected power calculated
$PSH_p+jQSH_p$: net nodal injected power scheduled/specified/set/given/assigned
$\Delta P_p+j\Delta Q_p$: nodal power residue/mismatch $(PSH_p+jQSH_p)-(P_p+jQ_p)$
$RP_p+jRQ_p$: modified nodal power residue/mismatch
$VSH_p$: scheduled/specified/set/given/assigned voltage magnitude at node-p
$\Phi_p$: nodal rotation/transformation angle
[RP]: vector of modified real power residue/mismatch
[RQ]: vector of modified reactive power residue/mismatch
[Y$\theta$]: gain matrix of the P-$\theta$ loadflow sub-problem defined by eqn. (1)
[YV]: gain matrix of the Q-V loadflow sub-problem defined by eqn. (2)
[GB]: gain/coefficient matrix defined by eqns. (51) & (52)
m: number of PQ-nodes
k: number of PV-nodes
n=m+k+1: total number of nodes q>p: q is the node adjacent to node-p excluding the case of q=p
[ ]: indicates enclosed variable symbol to be a vector or a matrix
PQ-node: load-node, where, Real-Power-P and Reactive-Power-Q are specified
PV-node: generator-node, where, Real-Power-P and Voltage-Magnitude-V are specified
Bold lettered symbols represent complex quantities in description, and the word "nodal" refers to any node-p.
Loadflow Computation: Each node in a power network is associated with four electrical quantities, which are voltage magnitude. voltage angle, real power, and reactive power. The loadflow computation involves calculation/determination of two unknown electrical quantities for other two given/specified/scheduled/set/known electrical quantities for each node. In other words the loadflow computation involves determination of unknown quantities in dependence on the given/specified/scheduled/set/known electrical quantities.
Loadflow Model: a set of equations describing the physical power network and its operation for the purpose of loadflow computation. The term 'loadflow model' can be alternatively referred to as 'model of the power network for loadflow computation'. The process of writing Mathematical equations that describe physical power network and its operation is called Mathematical Modeling. If the equations do not describe/represent the power network and its operation accurately the model is inaccurate, and the iterative loadflow computation method could be slow and unreliable in yielding converged loadflow computation. There could be variety of Loadflow Models depending on organization of set of equations describing the physical power network and its operation, including Decoupled Loadflow Models, Fast Super Decoupled Loadflow (FSDL) Model, and Super Super Decoupled Loadflow (SSDL) Model.
Loadflow Method: sequence of steps used to solve a set of equations describing the physical power network and its operation for the purpose of loadflow computation is called Loadflow Method, which term can alternatively be referred to as 'loadflow computation method' or 'method of loadflow computation'. One word for a set of equations describing the physical power network and its operation is: Model. In other words, sequence of steps used to solve a Loadflow Model is a Loadflow Method. The loadflow method involves steps of definition/formation of a loadflow model and its solution. There could be variety of Loadflow Methods depending on a loadflow model and iterative scheme used to solve the model including Decoupled Loadflow Methods, Fast Super Decoupled Loadflow (FSDL) Method, and Super Super Decoupled Loadflow (SSDL) Method. Most decoupled loadflow methods described in this application use either successive (1$\theta$, 1V), successive (1f, 1e), successive (1e, 1f) iteration schemes or simultaneous (1f, 1e) iteration scheme. The different iteration schemes are defined in the following description at appropriate points.

Prior art methods of loadflow computation of the kind carried out as step-30 in FIG. 3. are Gauss-Seidel-Patel Loadflow (GSPL) and Super Super Decoupled Loadflow (SSDL) methods. The Gauss-Seidel Loadflow method is well known to be not able to converge to high accuracy solution because of its iteration scheme that lacks self iterations. This realization led to the invention of the prior art Gauss-Seidel-Patel Loadflow (GSPL) method, and invention of Decoupled Gauss-Seidel-Patel Loadflow (DGSPL) method, which is claimed in this application. The prior art methods will now the described.

Gauss-Seidel-Patel Loadflow (GSPL)

The complex power injected into the node-p of a power network is given by the following equation.

$$P_p - jQ_p = V_p^* \sum_{q=1}^{n} Y_{pq} V_q = V_p^* Y_{pp} V_p + V_p^* \sum_{q>p} Y_{pq} V_q \quad (1)$$

Where, $$P_p = \text{Re}\left\{ V_p^* \sum_{q=1}^{n} Y_{pq} V_q \right\} \quad (2)$$

$$Q_p = -\text{Im}\left\{ V_p^* \sum_{q=1}^{n} Y_{pq} V_q \right\} \quad (3)$$

Where, Re means "real part of" and Im means "imaginary part of".

The Gauss-Seidel-Patel (GSP) numerical method is used to solve a set of simultaneous nonlinear algebraic equations iteratively. The GSPL-method calculates complex node voltage from any node-p equation (1) as given in equation (4).

$$V_p = \left[ \{(PSH_p - jQSH_p)/V_p^*\} - \sum_{q>p} Y_{pq} V_q \right] / Y_{pp} \quad (4)$$

Iteration Process

Iterations start with the experienced/reasonable/logical guess for the solution. The reference node also referred to as the slack-node voltage being specified, starting voltage guess is made for the remaining (n−1)-nodes in n-node network. Node voltage value is immediately updated with its newly calculated value in the iteration process in which one node voltage is calculated at a time using latest updated other node voltage values. A node voltage value calculation at a time process is iterated over (n−1)-nodes in an n-node network, the reference node voltage being specified not required to be calculated. For the iteration-(r+1), the complex voltage at node-p equation (4) and reactive power at node-p equation (3), becomes $$V_p^{(r+1)} = \left[ \left\{ \frac{(PSH_p - jQSH_p)}{(V_p^*)^r} \right\} - \sum_{q=1}^{p-1} Y_{pq} V_q^{(r+1)} - \sum_{q=p+1}^{n} Y_{pq} V_q^r \right] / Y_{pp} \quad (5)$$

$$Q_p^{(r+1)} = -\text{Im}\left\{ (V_p^*)^r \sum_{q=1}^{p-1} Y_{pq} V_q^{(r+1)} + (V_p^*)^r \sum_{q=p}^{n} Y_{pq} V_q^r \right\} \quad (6)$$

The well-known limitation of the Gauss-seidel numerical method to be not able to converge to the high accuracy solution, was resolved in the Gauss-Seidel-Patel (GSP) numerical method by the introduction of the concept of self-iteration of each calculated variable until convergence before proceeding to calculate the next. This is achieved by replacing equation (5) by equation (7) stated in the following where self-iteration-(sr+1) over a node variable itself within the global iteration-(r+1) over (n−1) nodes in the n-node network is depicted. During the self-iteration process only $V_p$ changes without affecting any of the terms involving $V_q$. At the start of the self-iteration $V_p^{sr} = V_p^r$, and at the convergence of the self-iteration $V_p^{(r+1)} = V_p^{(sr+1)}$.

$$(V_p^{(sr+1)})^{(r+1)} = \left[ \{(PSH_p - jQSH_p)/((V_p^*)^{sr})^r\} - \sum_{q=1}^{p-1} Y_{pq} V_q^{(r+1)} - \sum_{q=p+1}^{n} Y_{pq} V_q^r \right] / Y_{pp} \quad (7)$$

Self-Convergence

The self-iteration process for a node is carried out until changes in the real and imaginary parts of the node-p voltage calculated in two consecutive self-iterations are less than the specified tolerance. It has been possible to establish a relationship between the tolerance specification for self-convergence and the tolerance specification for global-convergence. It is found sufficient for the self-convergence tolerance specification to be ten times the global-convergence tolerance specification.

$$|\Delta f_p^{(sr+1)}| = |f_p^{(sr+1)} - f_p^{sr}| < 10\epsilon \quad (8)$$

$$|\Delta e_p^{(sr+1)}| = |e_p^{(sr+1)} - e_p^{sr}| < 10\epsilon \quad (9)$$

For the global-convergence tolerance specification of 0.000001, it has been found sufficient to have the self-convergence tolerance specification of 0.00001 in order to have the maximum real and reactive power mismatches of 0.0001 in the converged solution. However, for small networks under not difficult to solve conditions they respectively could be 0.00001 and 0.0001 or 0.000001 and 0.0001, and for large networks under difficult to solve conditions they sometimes need to be respectively 0.0000001 and 0.000001.

Convergence

The iteration process is carried out until changes in the real and imaginary parts of the set of (n−1)-node voltages calculated in two consecutive iterations are all less than the specified tolerance—$\epsilon$, as shown in equations (10) and (11). The lower the value of the specified tolerance for convergence check, the greater the solution accuracy.

$$|\Delta f_p^{(r+1)}| = |f_p^{(r+1)} - f_p^r| < \epsilon \quad (10)$$

$$|\Delta e_p^{(r+1)}| = |e_p^{(r+1)} - e_p^r| < \epsilon \quad (11)$$

Accelerated Convergence

The GSP-method being inherently slow to converge, it is characterized by the use of an acceleration factor applied to the difference in calculated node voltage between two consecutive iterations to speed-up the iterative solution process. The accelerated value of node-p voltage at iteration-(r+1) is given by $$V_p^{(r+1)}(\text{accelerated}) = V_p^r + \beta(V_p^{(r+1)} - V_p^r) \quad (12)$$

Where, $\beta$ is the real number called acceleration factor, the value of which for the best possible convergence for any given network can be determined by trial solutions. The GSP-method is very sensitive to the choice of $\beta$, causing very slow convergence and even divergence for the wrong choice.

Scheduled or Specified Voltage at a PV-Node

Of the four variables, real power $PSH_p$ and voltage magnitude $VSH_p$ are scheduled/specified/set at a PV-node. If the reactive power calculated using $VSH_p$ at the PV-node is within the upper and lower generation capability limits of a PV-node generator, it is capable of holding the specified voltage at its terminal. Therefore the complex voltage calculated by equation (5) or (7) by using actually calculated reactive power $Q_p$ in place of QSH$_p$ is adjusted to specified voltage magnitude by equation (13). However, in case of violation of upper or lower generation capability limits of a PV-node generator, a violated limit value is used for QSH$_p$ in (5) and (7), meaning a PV-node generator is no longer capable of holding its terminal voltage at its scheduled voltage VSH$_p$, and the PV-node is switched to a PQ-node type.

$$V_p^{(r+1)} = (VSH_p V_p^{(r+1)})/|V_p^{(r+1)}| \quad (13)$$

Calculation Steps of Gauss-Seidel Loadflow (GSL) Method

The steps of loadflow computation by GSPL method are shown in the flowchart of FIG. 1a. Referring to the flowchart of FIG. 1a, different steps are elaborated in steps marked with similar numbers in the following. The words "Read system data" in Step-1 correspond to step-10 and step-20 in FIG. 3, and step-14, step-20, step-32, step-44, step-50 in FIG. 4. All other steps in the following correspond to step-30 in FIG. 3, and step-60, step-62, and step-64 in FIG. 4.

1. Read system data and assign an initial approximate solution. If better solution estimate is not available, set specified voltage magnitude at PV-nodes, 1.0 p.u. voltage magnitude at PQ-nodes, and all the node angles equal to that of the slack-node angle, which is referred to as the flat-start
2. Form nodal admittance matrix, and Initialize iteration count r=1
3. Scan all the node of a network, except the slack-node whose voltage having been specified need not be calculated. Initialize node count p=1, and initialize maximum change in real and imaginary parts of node voltage variables DEMX=0.0 and DFMX=0.0
4. Test for the type of a node at a time. For the slack-node go to step-12, for a PQ-node go to the step-9, and for a PV-node follow the next step.
5. Compute $Q_p^{(r+1)}$ for use as an imaginary part in determining complex schedule power at a PV-node from equation (6) after adjusting its complex voltage for specified value by equation (13)
6. If $Q_p^{(r+1)}$ is greater than the upper reactive power generation capability limit of the PV-node generator, set QSH$_p$=the upper limit $Q_p^{max}$ for use in equation (7), and go to step-9. If not, follow the next step.
7. If $Q_p^{(r+1)}$ is less than the lower reactive power generation capability limit of the PV-node generator, set QSH$_p$=the lower limit $Q_p^{min}$ for use in equation (7), and go to step-9. If not, follow the next step.
8. Compute $V_p^{(r+1)}$ by equations (7), (8), (9) involving self iteration using QSH$_p$=$Q_p^{(r+1)}$, and adjust its value for specified voltage at the PV-node by equation (13), and go to step-10
9. Compute $V_p^{(r+1)}$ by equations (7), (8), (9) involving self iteration
10. Compute changes in the imaginary and real parts of the node-p voltage by using equations (10) and (11), and replace current value of DFMX and DEMX respectively in case any of them is larger.
11. Calculate accelerated value of $V_p^{(r+1)}$ by using equation (12), and update voltage by $V_p^r = V_p^{(r+1)}$ for immediate use in the next node voltage calculation.
12. Check for if the total numbers of nodes—n are scanned. That is if p<n increment p=p+1, and go to step-4. Otherwise follow the next step.
13. If DEMX and DFMX both are not less than the convergence tolerance ($\epsilon$) specified for the purpose of the accuracy of the solution, advance iteration count r=r+1 and go to step-3, otherwise follow the next step
14. From calculated and known values of complex voltage at different power network nodes, and tap position of tap changing transformers, calculate power flows through power network components, and reactive power generation at PV-nodes.

Decoupled Loadflow

In a class of decoupled loadflow methods, each decoupled method comprises a system of equations (14) and (15) differing in the definition of elements of [RP], [RQ], and [Y0] and [YV]. It is a system of equations for the separate calculation of voltage angle and voltage magnitude corrections.

$$[RP] = [Y0][\Delta\theta] \quad (14)$$

$$[RQ] = [YV][\Delta V] \quad (15)$$

Successive (1θ, 1V) Iteration Scheme

In this scheme (14) and (15) are solved alternately with intermediate updating. Each iteration involves one calculation of [RP] and [Δθ] to update [θ] and then one calculation of [RQ] and [ΔV] to update [V]. The sequence of equations (16) to (19) depicts the scheme.

$$[\Delta\theta] = [Y0]^{-1}[RP] \quad (16)$$

$$[\theta] = [V] + [\Delta V] \quad (17)$$

$$[\Delta V] = [YV]^{-1}[RQ] \quad (18)$$

$$[V] = [V] + [\Delta V] \quad (19)$$

The scheme involves solution of system of equations (14) and (15) in an iterative manner depicted in the sequence of equations (16) to (19). This scheme requires mismatch calculation for each half-iteration; because [RP] and [RQ] are calculated always using the most recent voltage values and it is block Gauss-Seidal approach. The scheme is block successive, which imparts increased stability to the solution process. This in turn improves convergence and increases the reliability of obtaining solution.

Super Super Decoupled Loadflow: SSDL

This method is not very sensitive to the restriction applied to nodal transformation angles; SSDL restricts transformation angles to the maximum of −48 degrees determined experimentally for the best possible convergence from non linearity considerations, which is depicted by equations (22) and (23). However, it gives closely similar performance over wide range of restriction applied to the transformation angles say, from −36 to −90 degrees.

$$RP_p = (\Delta P_p \cos\Phi_p + \Delta Q_p \sin\Phi_p)/V_p^2 \text{—for } PQ\text{-nodes} \quad (20)$$

$$RQ_p = (\Delta Q_p \cos\Phi_p - \Delta P_p \sin\Phi_p)/V_p \text{—for } PQ\text{-nodes} \quad (21)$$

$$\cos\Phi_p = \text{Absolute}(B_{pp}/\text{SQRT}(G_{pp}^2 + B_{pp}^2)) \geq \cos(-48°) \quad (22)$$

$$\sin\Phi_p = -\text{Absolute}(G_{pp}/\text{SQRT}(G_{pp}^2 + B_{pp}^2)) \geq \sin(-48°) \quad (23)$$

$$RP_p = \Delta P_p/(K_p V_p^2) \text{—for } PV\text{-nodes} \quad (24)$$

$$K_p = \text{Absolute}(B_{pp}/Y0_{pp}) \quad (25)$$

$$Y\theta_{pq} = \begin{bmatrix} -Y_{pq} & \text{-for branch } r/x \text{ ratio} \leq 3.0 \\ -(B_{pq} + 0.9(Y_{pq} - B_{pq})) & \text{-for branch } r/x \text{ ratio} > 3.0 \\ & \text{-for branches connected} \\ -B_{pq} & \text{between two } PV\text{-nodes} \\ & \text{or a } PV\text{-node and} \\ & \text{the slack-node} \end{bmatrix} \quad (26)$$

$$YV_{pq} = \begin{bmatrix} -Y_{pq} & \text{-for branch } r/x \text{ ratio} \leq 3.0 \\ -(B_{pq} + 0.9(Y_{pq} - B_{pq})) & \text{-for branch } r/x \text{ ratio} > 3.0 \end{bmatrix} \quad (27)$$

$$Y\theta_{pp} = \sum_{q>p} -Y\theta_{pq} \text{ and } YV_{pp} = b'_p + \sum_{q>p} -YV_{pq} \quad (28)$$

$$b'_p = (QSH_p \cos\Phi_p - PSH_p \sin\Phi_p / V_s^2) = b_p \cos\Phi_p \text{ or} \quad (29)$$
$$b'_p = 2(QSH_p \cos\Phi_p - PSH_p \sin\Phi_p) / V_s^2$$

where, the words SQRT means take square root of the expression enclosed in parenthesis immediately following words SQRT, and $K_p$ as defined in equation (25) is initially restricted to the minimum value of 0.75 determined experimentally; however its restriction is lowered to the minimum value of 0.6 when its average over all less than 1.0 values at PV nodes is less than 0.6. Restrictions to the factor $K_p$ as stated in the above is system independent. However it can be tuned for the best possible convergence for any given system. In case of systems of only PQ-nodes and without any PV-nodes, equations (26) and (27) simply be taken as $Y\theta_{pq} = YV_{pq} = -Y_{pq}$.

Branch admittance magnitude in (26) and (27) is of the same algebraic sign as its susceptance. Elements of the two gain matrices differ in that diagonal elements of [YV] additionally contain the b' values given by equations (28) and (29) and in respect of elements corresponding to branches connected between two PV-nodes or a PV-node and the slack-node. Equations (22) and (23) with inequality sign implies that transformation angles are restricted to maximum of −48 degrees for SSDL. The model consists of equations (16) to (29). In two simple variations of the SSDL model, one is to make $YV_{pq} = Y\theta_{pq}$ and the other is to make $Y\theta_{pq} = YV_{pq}$.

Calculation Steps of Super Super Decoupled Loadflow (SSDL) Method

The steps of loadflow computation by SSDL method are shown in the flowchart of FIG. 1b. Referring to the flowchart of FIG. 1b, different steps are elaborated in steps marked with similar letters in the following. The words "Read system data" in Step-1 correspond to step-10 and step-20 in FIG. 3, and step-14, step-20, step-32, step-44, step-50 in FIG. 4. All other steps in the following correspond to step-30 in FIG. 3, and step-60, step-62, and step-64 in FIG. 4.

a. Read system data and assign an initial approximate solution. If better solution estimate is not available, set voltage magnitude and angle of all nodes equal to those of the slack-node. This is referred to as the slack-start.
b. Form nodal admittance matrix, calculate Cos $\Phi_p$, and Sin $\Phi_p$ using equations (22) and (23), and store them. Initialize iteration count ITRP=ITRQ=r=0
c. Check Cos $\Phi_p$ and Sin $\Phi_p$, If they, respectively, are less than the Cosine and Sine of −48 degrees, equate them, respectively, to those of −48 degrees.
d. Form (m+k)×(m+k) size matrices [Yθ] and [YV] of (14) and (15) respectively each in a compact storage exploiting sparsity. The matrices are formed using equations (26), (27), (28), and (29). In [YV] matrix, replace diagonal elements corresponding to PV-nodes by very large value (say, 10.0**10). In case [YV] is of dimension (m×m), this is not required to be performed. Factorize [Yθ] and [YV] using the same ordering of nodes regardless of node-types and store them using the same indexing and addressing information. In case [YV] is of dimension (m×m), it is factorized using different ordering than that of [Yθ].
e. Compute residues [ΔP] at PQ- and PV-nodes and [ΔQ] at only PQ-nodes. If all are less than the tolerance (ε), proceed to step-n. Otherwise follow the next step.
f. Compute the vector of modified residues [RP] using (20) for PQ-nodes, and using (24) and (25) for PV-nodes.
g. Solve (16) for [Δθ] and update voltage angles using, [θ]+[Δθ].
h. Set voltage magnitudes of PV-nodes equal to the specified values, and Increment the iteration count ITRP=ITRP+1 and r=(ITRP+ITRQ)/2.
i. Compute residues [ΔP] at PQ- and PV-nodes and [ΔQ] at PQ-nodes only. If all are less than the tolerance (ε), proceed to step-n. Otherwise follow the next step.
j. Compute the vector of modified residues [RQ] using (21) for only PQ-nodes.
k. Solve (18) for [ΔV] and update PQ-node magnitudes using [V]=[V]+[ΔV]. While solving equation (18), skip all the rows and columns corresponding to PV-nodes.
l. Calculate reactive power generation at PV-nodes and tap positions of tap changing transformers. If the maximum and minimum reactive power generation capability and transformer tap position limits are violated, implement the violated physical limits and adjust the loadflow solution by the method of reference: "LTC Transformers and MVAR violations in the Fast Decoupled Load Flow, IEEE Trans., PAS-101, No. 9, PP. 3328-3332, September 1982."
m. Increment the iteration count ITRQ=ITRQ+1 and r=(ITRP+ITRQ)/2, and go to step-e.
n. From calculated and known values of voltage magnitude and voltage angle at different power network nodes, and tap position of tap changing transformers, calculate power flows through power network components, and reactive power generation at PV-nodes.

SUMMARY OF THE INVENTION

It is a primary object of the present invention to improve convergence and efficiency of the prior art GSPL and SSDL calculation methods under wide range of system operating conditions and network parameters for use in power flow control and voltage control in the power system.

The above and other objects are achieved, according to the present invention, with Decoupled Gauss-Seidel-Patel Loadflow (DGSPL) and Patel Decoupled Loadflow (PDL) calculation methods for Electrical Power System. In context of voltage control, the inventive system of loadflow computation for Electrical Power system consisting of plurality of electro-mechanical rotating machines, transformers and electrical loads connected in a network, each machine having a reactive power characteristic and an excitation element which is controllable for adjusting the reactive power generated or absorbed by the machine, and some of the transformers each having a tap changing element, which is controllable for adjusting turns ratio or alternatively terminal voltage of the transformer, said system comprising:

means defining and solving loadflow model of the power network characterized by inventive DGSPL and PDL models for providing an indication of the quantity of reactive power to be supplied by each generator including the reference/slack node generator, and for providing an indication of turns ratio of each tap-changing transformer in dependence on the obtained-online or given/specified/set/known controlled network variables/parameters, and physical limits of operation of the power network components, machine control means connected to the said means defining and solving loadflow model and to the excitation elements of the rotating machines for controlling the operation of the excitation elements of machines to produce or absorb the amount of reactive power indicated by said means defining and solving loadflow model in dependence on the set of obtained-online or given/specified/set/known controlled network variables/parameters, and physical limits of excitation elements, transformer tap position control means connected to the said means defining and solving loadflow model and to the tap changing elements of the controllable transformers for controlling the operation of the tap changing elements to adjust the turns ratios of transformers indicated by the said means defining and solving loadflow model in dependence on the set of obtained-online or given/specified/set/known controlled network variables/parameters, and operating limits of the tap-changing elements.

The method and system of voltage control according to the preferred embodiment of the present invention provide voltage control for the nodes connected to PV-node generators and tap changing transformers for a network in which real power assignments have already been fixed. The said voltage control is realized by controlling reactive power generation and transformer tap positions.

The inventive system of decoupled loadflow computation can be used to solve a model of the Electrical Power System for voltage control. For this purpose real and reactive power assignments or settings at PQ-nodes, real power and voltage magnitude assignments or settings at PV-nodes and transformer turns ratios, open/close status of all circuit breaker, the reactive capability characteristic or curve for each machine, maximum and minimum tap positions limits of tap changing transformers, operating limits of all other network components, and the impedance or admittance of all lines are supplied. DGSPL or PDL model is solved by an iterative process until convergence. During this solution the quantities which can vary are the real and reactive power at the reference/slack node, the reactive power set points for each PV-node generator, the transformation ratios of tap-changing transformers, and voltages on all PQ-nodes nodes, all being held within the specified ranges. When the iterative process converges to a solution, indications of reactive power generation at PV-nodes and transformer turns-ratios or tap-settings are provided. Based on the known reactive power capability characteristics of each PV-node generator, the determined reactive power values are used to adjust the excitation current to each generator to establish the reactive power set points. The transformer taps are set in accordance with the turns ratio indication provided by the system of loadflow computation.

For voltage control, system of DGSPL or PDL calculation can be employed either on-line or off-line. In off-line studies, the user can simulate and experiment with various sets of operating conditions and determine reactive power generation and transformer tap settings requirements. For on-line operation, the load flow calculation system is provided with data identifying the current real and reactive power assignments and transformer transformation ratios, the present status of all switches and circuit breakers in the network and machine characteristic curves in steps-10 and -20 in FIG. 3, and steps 12, 20, 32, 44, and 50 in FIG. 4 described below. Based on this information or alternately in dependence on this information, a model of the system provide the values for the corresponding node voltages, reactive power set points for each machine and the transformation ratio and tap changer position for each tap-changing transformer.

Inventions include Decoupled Gauss-Seidel-Patel Loadflow (DGSPL) and Patel Decoupled Loadflow (PDL) methods for the solution of complex simultaneous algebraic power injection equations or any set of complex simultaneous algebraic equations arising in any other subject areas. The invented DGSPL and PDL methods introduces block successive iteration scheme (Jf, Je) or (Je, Jf), where J can take any number decided by the user or determined experimentally in addition to the original successive displacement scheme of the well known Gauss-Seidel method used in loadflow computations. In other words, in calculation of imaginary part 'f' of the complex voltage at all of the nodes in the network using formal successive displacement Gauss-Seidel-Patel method, the real part 'e' of the complex voltage at all nodes is held constant and vice versa.

BRIEF DESCRIPTION OF DRAWINGS

FIG. 1 is a flow-charts of the prior art GSPL and SSDL methods

FIG. 2 is a flow-charts embodiment of the invented DGSPL, PDL methods.

FIG. 3 is a flow-chart of the overall controlling method for an electrical power system involving load-flow calculation as a step which can be executed using one of the invented loadflow calculation method of FIG. 2.

FIG. 4 is a flow-chart of the simple special case of voltage control system in overall controlling system of FIG. 3 for an electrical power system FIG. 5 is a one-line diagram of an exemplary 6-node power network having a slack/swing/reference node, two PV-nodes, and three PQ-nodes

DESCRIPTION OF A PREFERRED EMBODIMENT

A loadflow computation is involved as a step in power flow control and/or voltage control in accordance with FIG. 3 or FIG. 4. A preferred embodiment of the present invention is described with reference to FIG. 5 as directed to achieving voltage control.

FIG. 5 is a simplified one-line diagram of an exemplary utility power network to which the present invention may be applied. The fundamentals of one-line diagrams are described in section 6.11 of the text ELEMENTS OF POWER SYSTEM ANALYSIS, forth edition, by William D. Stevenson, Jr., McGrow-Hill Company, 1982. In FIG. 5, each thick vertical line is a network node. The nodes are interconnected in a desired manner by transmission lines and transformers each having its impedance, which appears in the loadflow models. Two transformers in FIG. 5 are equipped with tap changers to control their turns ratios in order to control terminal voltage of node-1 and node-2 where large loads are connected.

Node-6 is a reference-node alternatively referred to as the slack or swing-node, representing the biggest power plant in a power network. Nodes-4 and -5 are PV-nodes where generators are connected, and nodes-1, -2, and -3 are PQ-nodes where loads are connected. It should be noted that the nodes-4, -5, and -6 each represents a power plant that contains many generators in parallel operation. The single generator symbol at each of the nodes-4, -5, and -6 is equivalent of all generators in each plant. The power network further includes controllable circuit breakers located at each end of the transmission lines and transformers, and depicted by cross markings in one-line diagram of FIG. 5. The circuit breakers can be operated or in other words opened or closed manually by the power system operator or relevant circuit breakers operate automatically consequent of unhealthy or faulty operating conditions. The operation of one or more circuit breakers modify the configuration of the network. The arrows extending certain nodes represent loads.

A goal of the present invention is to provide a reliable and computationally efficient loadflow computation that appears as a step in power flow control and/or voltage control systems of FIG. 3 and FIG. 4. However, the preferred embodiment of loadflow computation as a step in control of terminal node voltages of PV-node generators and tap-changing transformers is illustrated in the flow diagram of FIG. 4 in which present invention resides in function steps 60 and 62.

Short description of other possible embodiment of the present invention is also provided herein. The present invention relates to control of utility/industrial power networks of the types including plurality of power plants/generators and one or more motors/loads, and connected to other external utility. In the utility/industrial systems of this type, it is the usual practice to adjust the real and reactive power produced by each generator and each of the other sources including synchronous condensers and capacitor/inductor banks, in order to optimize the real and reactive power generation assignments of the system. Healthy or secure operation of the network can be shifted to optimized operation through corrective control produced by optimization functions without violation of security constraints. This is referred to as security constrained optimization of operation. Such an optimization is described in the U.S. Pat. No. 5,081,591 dated Jan. 13, 1992: "Optimizing Reactive Power Distribution in an Industrial Power Network", where the present invention can be embodied by replacing the step nos. 56 and 66 each by a step of constant gain matrix [GB] and replacing steps of "Exercise Newton-Raphson Algorithm" by steps of "Exercise Patel Decoupled Loadflow Computation" in places of steps 58 and 68. This is just to indicate the possible embodiment of the present invention in optimization functions like in many others including state estimation function. However, invention is being claimed through a simplified embodiment without optimization function as in FIG. 4 in this application. The inventive steps-60 and -62 in FIG. 4 are different than those corresponding steps-56, and -58, which constitute a well known Newton-Raphson loadflow method, and were not inventive even in U.S. Pat. No. 5,081,591.

In FIG. 4, function step 10 provides stored impedance values of each network component in the system. This data is modified in a function step 12, which contains stored information about die open or close status of each circuit breaker. For each breaker that is open, the function step 12 assigns very high impedance to the associated line or transformer. The resulting data is than employed in a function step 14 to establish an admittance matrix for the power network. The data provided by function step 10 can be input by the computer operator from calculations based on measured values of impedance of each line and transformer, or on the basis of impedance measurements after the power network has been assembled.

Each of the transformers T1 and T2 in FIG. 5 is a tap changing transformer having a plurality of tap positions each representing a given transformation ratio. An indication of initially assigned transformation ratio for each transformer is provided by function step 20.

The indications provided by function steps 14, and 20 are supplied to a function step 60 in which constant gain matrix [GB] of the invented Patel Decoupled Loadflow model is constructed, factorized and stored. The gain matrix [GB] is conventional tool employed for solving Patel Decoupled Loadflow model defined by equations (51) and (52) for a power system.

Indications of initial reactive power, or Q on each node, based on initial calculations or measurements, are provided by a function step 30 and these indications are used in function step 32, to assign a Q level to each generator and motor. Initially, the Q assigned to each machine can be the same as the indicated Q value for the node to which that machine is connected.

An indication of measured real power, P, on each node is supplied by function step 40. Indications of assigned/specified/scheduled/set generating plant loads that are constituted by known program are provided by function step 42, which assigns the real power, P, load for each generating plant on the basis of the total P, which must be generated within the power system. The value of P assigned to each power plant represents an economic optimum, and these values represent fixed constraints on the variations, which can be made by the system according to the present invention. The indications provided by function steps 40 and 42 are supplied to function step 44 which adjusts the P distribution on the various plant nodes accordingly. Function step 50 assigns initial approximate or guess solution to begin iterative method of loadflow computation, and reads data file of operating limits on power network components, such as maximum and minimum reactive power generation capability limits of PV-nodes generators.

The indications provided by function steps 32, 44, 50 and 60 are supplied to function step 62 where inventive Decoupled Gauss-Seidel-Patel Loadflow computation or Patel Decoupled Loadflow computation is carried out, the results of which appear in function step 64. The loadflow computation yields voltage magnitudes and voltage angles at PQ-nodes, real and reactive power generation by the slack/swing/reference node generator, voltage angles and reactive power generation indications at PV-nodes, and transformer turns ratio or tap position indications for tap changing transformers. The system stores in step 62 a representation of the reactive capability characteristic of each PV-node generator and these characteristics act as constraints on the reactive power that can be calculated for each PV-node generator for indication in step 64. The indications provided in step 64 actuate machine excitation control and transformer tap position control. All the loadflow computation methods using Decoupled models can be used to effect efficient and reliable voltage control in power systems as in the process flow diagram of FIG. 4.

Inventions include Decoupled Gauss-Seidel-Patel Loadflow (DGSPL) and PDL methods for the solution of complex simultaneous algebraic power injection equations or any set of complex simultaneous algebraic equations arising in any other subject areas. The invented DGSPL method introduces block successive iteration scheme (Jf, Je) or (Je, Jf), where J can take any number decided by the user or determined experimentally in addition to the original successive displacement scheme of the well known Gauss-Seidel method used in loadflow computations. In other words, in calculation of imaginary part 'f' of the complex voltage at all of the nodes in the network using formal successive displacement Gauss-Seidel-Patel method, the real part 'e' of the complex voltage at all nodes is held constant and vice versa.

Decoupled Gauss-Seidel-Patel Loadflow (DGSPL)

Gauss-seidel-Patel numerical method is further developed by de-coupling the complex power injection into two quadratic equations and solving them simultaneously or preferably successively as described in the following.

Real and reactive power injection equation at any node-p in rectangular coordinates can be written as, $$PSH_p = \quad (30)$$
$$(G_{pp} + g_p)(e_p^2 + f_p^2) + \sum_{q>p}[e_p(e_qG_{pq} - f_qB_{pq}) + f_p(f_qG_{pq} + e_qB_{pq})]$$

$$QSH_p = -(B_{pp} + b_p)(e_p^2 + f_p^2) - \quad (31)$$
$$\sum_{q>p}[e_p(f_qG_{pq} + e_qB_{pq}) - f_p(e_qG_{pq} - f_qB_{pq})]$$

$PSH_p$ and $QSH_p$ can be added as $(I_{1p}PSH_p + I_{2p}QSH_p)$, where $I_{1p}$ & $I_{2p}$ can take any values from $-\infty, \ldots, -2, -1, 0, 1, 2, \ldots, \infty$. Normally, $I_{1p}$ & $I_{2p}$ both take value of 1.0. However, they can take any other value, both the same or different, to be determined experimentally for the best possible convergence. This technique of adding real and imaginary parts of the complex equation is applicable in all other subject areas requiring solution of complex simultaneous equations. Therefore, $$I_{1p}PSH_p + I_{2p}QSH_p = A_p(e_p^2 + f_p^2) + \quad (32)$$
$$e_p\sum_{q>p}(I_{1p}BB1_p - I_{2p}BB2_p) + f_p\sum_{q>p}(I_{2p}BB1_p + I_{1p}BB2_p)$$

Where, $$A_p = I_{1p}(G_{pp} + g_p) - I_{2p}(B_{pp} + b_p) \quad (33)$$

$$BB1_p = (e_qG_{pq} - f_qB_{pq}) \quad (34)$$

$$BB2_p = (f_qG_{pq} + e_qB_{pq}) \quad (35)$$

Now, equation (32) can be decoupled into two quadratic equations as, $$A_{1p}e_p^2 + B_{1p}e_p + C_{1p} = 0 \quad (36)$$

$$A_{2p}f_p^2 + B_{2p}f_p + C_{2p} = 0 \quad (37)$$

Where, $$A_{1p} = A_{2p} = A_p \quad (38)$$

$$B_{1p} = \sum_{q>p}(I_{1p}BB1_p - I_{2p}BB2_p) \quad (39)$$

$$B_{2p} = \sum_{q>p}(I_{2p}BB1_p + I_{1p}BB2_p) \quad (40)$$

$$C_{1p} = A_{2p}f_p^2 + B_{2p}f_p - (I_{1p}PSH_p + I_{2p}QSH_p) \quad (41)$$

$$C_{2p} = A_{1p}e_p^2 + B_{1p}e_p - (I_{1p}PSH_p + I_{2p}QSH_p) \quad (42)$$

Where, $PSH_p$ and $QSH_p$ are scheduled or specified values. However, $QSH_p$ at a PV-node is calculated value using specified voltage magnitude constrained by upper and lower reactive power generation capability limits of a PV-node generator, and the same description under the heading of Scheduled/specified/set voltage at a PV-node on page-9 of this application is applicable at this point. Equations (36) and (37) can be iterated incorporating self-iteration for solution as depicted in equations (43) and (44).

$$(e_p^{(sr+1)})^{(r+1)} = [\{-C_{1p}/((e_p)^{sr})^r\} - (B_{1p})^r]/A_{1p} \quad (43)$$

$$(f_p^{(sr+1)})^{(r+1)} = [\{-C_{2p}/((f_p)^{sr})^r\} - (B_{2p})^r]/A_{2p} \quad (44)$$

Equations (36) and (37), which are quadratic in $e_p$ and $f_p$, can also be iterated without incorporating self-iteration for solution as depicted in equations (45) and (46).

$$e_p^{(r+1)} = (-B_{1p}^r + \text{SQRT}((B_{1p}^r)^2 - 4A_{1p}C_{1p}))/2A_1 \quad (45)$$

$$f_p^{(r+1)} = (-B_{2p}^r + \text{SQRT}((B_{2p}^r)^2 - 4A_{2p}C_{2p}))/2A_2 \quad (46)$$

Equations (36), (43) or (45) and (37), (44) or (46) can be solved simultaneously or successively. There are three possible successive iteration schemes in which equations (36), (43) or (45) and (37), (44) or (46) can be solved. It is possible to solve either first (36), (43) or (45) and, then (37), (44) or (46) or first (37), (44) or (46) and, then (36), (43) or (45).

Scheme-1

Solve (36), (43) or (45) and (37), (44) or (46) successively for each node, always using latest available $e_p$ and $f_p$, until calculations converge to a solution. In other words, for the known (available) values of $e_p$ at a node, solve (37), (44) or (46) for $f_p$ and then, for the known (available) values of $f_p$ at the same node, solve (36), (43) or (45) for $e_p$. This calculation for the single node is carried out for certain number of iterations, before proceeding to the next node. Repeat calculations over all nodes always using latest available $e_p$ and $f_p$, until calculations converge to a solution.

Scheme-2

Solve (36), (43) or (45) and (37), (44) or (46) successively for each group of nodes in a network, always using latest available $e_p$ and $f_p$, until calculations converge to a solution. A group of nodes could be directly connected nodes to a given node, creating n-groups in a n-node network. In other words, for the known (available) values of $e_p$ at nodes in a group, solve (37), (44) or (46) for $f_p$ at the same nodes of the group using latest available $f_p$. Then, for the known (available) values of $f_p$ at the same group of nodes, solve (36), (43) or (45) for $e_p$ at the same nodes of the group using latest available $e_p$. This calculation for a group of nodes is carried out for certain number of iterations, before proceeding to the next group of nodes. Repeat calculations over all group of nodes always using latest available $e_p$ and $f_p$, until calculations converge to a solution.

Scheme-3

For the known (available) values of $e_p$ at all nodes, solve (37), (44) or (46) for $f_p$ for all the nodes in the network always using latest available $f_p$ in subsequent calculations. Then, for the known (available) values of $f_p$ at all nodes, solve (36), (43) or (45) for $e_p$ for all the nodes in the network always using latest available $e_p$ in subsequent calculations. Repeat until calculations converge to a solution.

The basic scheme described in the above three schemes is referred to as (1f, 1e) block successive iteration scheme. The calculations can also be organized as (2f, 2e), (3f, 3e), (1e, 1f), (2e, 2f), (3e, 3f), and so on, block successive iteration schemes. The size of block is of one node in scheme-1, a given group of nodes in scheme-2, and all nodes of the network in scheme-3. $e_p^{(r+1)}$ and $f_p^{(r+1)}$ values calculated by (43) or (45) and (44) or (46) are modified as, $$e_p^{(r+1)} = e_p^r + \beta \Delta e_p^{(r+1)} \quad (47)$$

$$f_p^{(r+1)} = f_p^r + \beta \Delta f_p^{(r+1)} \quad (48)$$

Where, $$\Delta e_p^{(r+1)} = e_p^{(r+1)} - e_p^r \qquad (49)$$

$$\Delta f_p^{(r+1)} = f_p^{(r+1)} - f_p^r \qquad (50)$$

and β is an acceleration factor used to speed-up the convergence, and $\Delta e_p^{(r+1)}$ and $\Delta f_p^{(r+1)}$ are the corrections in the real and imaginary parts of the voltage at node-p in the (r+1)th iteration.

Calculation Steps of Decoupled Gauss-Seidel-Patel Loadflow (DGSPL) Method

The steps of loadflow computation method. DGSPL method are shown in the flowchart of FIG. 2a, which is given for block successive (Jf, Je) iteration scheme, where number J is given as input data. Referring to the flowchart of FIG. 2a, different steps are elaborated in steps marked with similar numbers in the following. The words "Read system data" in Step-1 correspond to step-10 and step-20 in FIG. 3, and step-14, step-20, step-32, step-44, step-50 in FIG. 4. All other steps in the following correspond to step-30 in FIG. 3, and step-60, step-62, and step-64 in FIG. 4.

21. Read system data and assign an initial approximate solution. If better solution estimate is not available, set specified voltage magnitude at PV-nodes, 1.0 p.u. voltage magnitude at PQ-nodes, and all the node angles equal to that of the slack-node angle, which is referred to as the flat-start.
22. Read number J for the iteration scheme (Jf, Je), and form nodal admittance matrix, and Initialize iteration count r=ITRF=ITRE=0, and DEMX=DFMX=0.0.
23. Scan all the node of a network J number of times, except the slack-node whose voltage having been specified need not be calculated. Initialize node count p=1, and initialize maximum change in imaginary parts of node voltage variables DFMX=0.0.
24. Test for the type of a node at a time. For the slack-node go to step-32, for a PQ-node go to the step-29, and for a PV-node follow the next step.
25. Compute $Q_p^{(r+1)}$ at a PV-node from equation (31) after adjusting its complex voltage for specified value by equation (13)
26. If $Q_p^{(r+1)}$ is greater than the upper reactive power generation capability limit of the PV-node generator, set $QSH_p$=the upper limit $Q_p^{max}$ for use in equation (42), and go to step-29. If not, follow the next step.
27. If $Q_p^{(r+1)}$ is less than the lower reactive power generation capability limit of the PV-node generator, set $QSH_p$=the lower limit $Q_p^{min}$ for use in equation (42), and go to step-29. If not, follow the next step.
28. Compute $f_p^{(r+1)}$ from equation (44) or (46) using $QSH_p$=$Q_p^{(r+1)}$ in equation (42), and adjust its value for specified voltage at the PV-node by equation (13), and go to step-30
29. Compute $f_p^{(r+1)}$ from equation (44) or (46).
30. Compute change in the imaginary part of the node-p voltage $\Delta f_p^{(r+1)}$ by using equations (50), and replace current value of DFMX by $\Delta f_p^{(r+1)}$ in case it is larger.
31. Calculate accelerated value of $f_p^{(r+1)}$ by using equation (48), and update voltage by $f_p^r = f_p^{(r+1)}$ for immediate use in the next node voltage calculation.
32. Check for if the total numbers of nodes—n are scanned. That is if p<n, increment p=p+1, and go to step-24. Otherwise follow the next step.
33. Advance iteration count ITRF=ITRF+1. If DEMX and DFMX both are less than the convergence tolerance (ε) specified for the purpose of the accuracy of the solution, go to step-45. If not check if ITRF equals J. If not go to step-23, otherwise go to next step.
34. Scan all the node of a network, except the slack-node whose voltage having been specified need not be calculated. Initialize node count p=1, and initialize maximum change in real parts of node voltage variables DEMX=0.0.
35. Test for the type of a node at a time. For the slack-node go to step-43, for a PQ-node go to the step-40, and for a PV-node follow the next step.
36. Compute $Q_p^{(r+1)}$ at a PV-node from equation (31) after adjusting its complex voltage for specified value by equation (13)
37. If $Q_p^{(r+1)}$ is greater than the upper reactive power generation capability limit of the PV-node generator, set $QSH_p$=the upper limit $Q_p^{max}$ for use in equation (41), and go to step-40. If not, follow the next step.
38. If $Q_p^{(r+1)}$ is less than the lower reactive power generation capability limit of the PV-node generator, set $QSH_p$=the lower limit $Q_p^{min}$ for use in equation (41), and go to step-40. If not, follow the next step.
39. Compute $e_p^{(r+1)}$ from equation (43) or (45) using $QSH_p$=$Q_p^{(r+1)}$ in equation (41), and adjust its value for specified voltage at the PV-node by equation (13), and go to step-41
40. Compute $e_p^{(r+1)}$ from equation (43) or (45)
41. Compute change in the real pant of the node-p voltage $\Delta e_p^{(r+1)}$ by using equation (49), and replace current value of DEMX by $\Delta e_p^{(r+1)}$ in case it is larger.
42. Calculate accelerated value of $e_p^{(r+1)}$ by using equation (47), and update voltage by $e_p^r = e_p^{(r+1)}$ for immediate use in the next node voltage calculation.
43. Check for if the total numbers of nodes—n are scanned. That is if p<n, increment p=p+1, and go to step-35. Otherwise follow the next step.
44. Advance iteration count ITRE=ITRE+1. IF DFMX and DEMX both are less than the convergence tolerance (ε) specified for the purpose of the accuracy of the solution, go to step-45 If not check if ITRE equals J. If yes go to step-23, otherwise go to step-34.
45. From calculated and known values of complex voltage at different power network nodes, and tap position of tap changing transformers, calculate power flows through power network components, and reactive power generation at PV-nodes.

Successive (1e, 1f) Iteration Scheme

In this scheme (36), (43) or (45) and (37), (44) or (46) are solved alternately with intermediate updating. Each iteration involves one calculation of [e] and [Δe] to update [e] and then one calculation of [f] and [Δf] to update [f]. The sequence of equations (36), (43) or (45), (47), and then (37), (44) or (46), (48) depicts the scheme. The scheme involves solution of system of equations (36) and (37) in an iterative manner. This scheme is block Gauss-Seidal approach. The scheme is block successive in addition to the original successive displacement scheme of the Gauss-Seidel approach, which imparts increased stability to the solution process. This in turn improves convergence and increases the reliability of obtaining solution. Similarly, there could be others like (2e, 2), (3e, 3f), . . . block successive iteration schemes.

Successive (1f, 1e) Iteration Scheme

In this scheme (37), (44) or (46) and (36), (43) or (45) are solved alternately with intermediate updating. Each iteration involves one calculation of [f] and [Δf] to update [f] and then one calculation of [e] and [Δe] to update [e]. The sequence of equations (37), (44) or (46), (48), and then (36), (43) or (45), (47) depicts the scheme. The scheme involves solution of system of equations (37) and (36) in an iterative manner. This scheme is block Gauss-Seidal approach. The scheme is block successive in addition to the original successive displacement scheme of the Gauss-Seidel approach, which imparts increased stability to the solution process. This in turn improves convergence and increases the reliability of obtaining solution. Similarly, there could be others like (2f, 2e), (3f, 3e), . . . block successive iteration schemes.

Inventions include Patel Numerical Method (PNM) for the solution of simultaneous nonlinear algebraic equations. The PNM involves organizing a set of nonlinear algebraic equations in linear form as a product of coefficient matrix and unknown vector on one side of the matrix equation and all other terms on the other side as known vector. Then solving the linear matrix equation for unknown vector in an iterative fashion. In case of simultaneous nonlinear complex algebraic equations such as complex nodal power injection equations of power network, the method can best be realized by expressing the equations in rectangular coordinates leading to invented what is referred to as Patel Decoupled Loadflow (PDL) method, which is applicable to any set of simultaneous nonlinear complex algebraic equations arising in any other subject areas.

Patel Decoupled Loadflow (PDL)

Patel Decoupled Loadflow model comprises a system of equations (51) and (52) It is a system of equations for the separate calculation of imaginary and real parts of the complex node voltages.

$$[RP]=[GB][f] \quad (51)$$

$$[RQ]=[GB][e] \quad (52)$$

Wherein, each component of [RP], [RQ], and [GB] are defined by following equations.

$$RP_p = [(I_{1p}PSH_p + I_{2p}QSH_p)/f_p] - [I_{1p}(G_{pp}+g_p) - I_{2p}(B_{pp}+b_p)] \quad (53)$$
$$e_p^2/f_p - (e_p/f_p)\sum_{q>p}(I_{1p}G_{pq} - I_{2p}B_{pq})e_q +$$
$$(e_p/f_p)\sum_{q>p}(I_{2p}G_{pq} + I_{1p}B_{pq})f_q - \sum_{q>p}(I_{2p}G_{pq} + I_{1p}B_{pq})e_q$$

$$RQ_p = [(I_{1p}PSH_p + I_{2p}QSH_p)/e_p] - [I_{1p}(G_{pp}+g_p) - I_{2p}(B_{pp}+b_p)] \quad (54)$$
$$f_p^2/e_p - (f_p/e_p)\sum_{q>p}(I_{1p}G_{pq} - I_{2p}B_{pq})f_q -$$
$$(f_p/e_p)\sum_{q>p}(I_{2p}G_{pq} + I_{1p}B_{pq})e_q - \sum_{q>p}(I_{2p}G_{pq} + I_{1p}B_{pq})f_q$$

$$GB_{pq} = I_{1p}G_{pq} - I_{2p}B_{pq} \quad (55)$$

$$GB_{pp} = [I_{1p}(G_{pp}+g_p) - I_{2p}(B_{pp}+b_p)] \quad (56)$$

Equations (51) and (52), which represent decoupled subproblems of the loadflow problem, can be written for solving each linearized sub-problem by Guass-Seidel method as equations (57) and (58) respectively.

$$f_p^{(r+1)} = \left[RP_p - \sum_{q=1}^{p-1} GB_{pq}f_q^{(r+1)} - \sum_{q=p+1}^{n} GB_{pq}f_q^{(r)}\right]/GB_{pp} \quad (57)$$

$$e_p^{(r+1)} = \left[RQ_p - \sum_{q=1}^{p-1} GB_{pq}e_q^{(r+1)} - \sum_{q=p+1}^{n} GB_{pq}e_q^{(r)}\right]/GB_{pp} \quad (58)$$

At the start of the solution of (51) by Gauss-Seidel method represented by (57), [RP] is calculated using latest available estimate of $f_p$ and $e_p$, and $f_p$ at all nodes is stored as [f0], and during iterations only $f_p$ changes until the process is stopped by pre-determined number of iterations or changes in $f_p$ at all nodes in consecutive iterations of (57) are less than or equal to specified tolerance value. When iterations of (57) are stopped, the available values of $f_p$ at all nodes is vector [f]. Similarly, At the start of the solution of (52) by Gauss-Seidel method represented by (58), [RQ] is calculated using latest available estimate of $f_p$ and $e_p$, and $e_p$ at all nodes is stored as [e0], and during iterations only $e_p$ changes until the process is stopped by pre-determined number of iterations or changes in $e_p$ at all nodes in consecutive iterations of (58) are less than or equal to specified tolerance value. When iterations of (58) are stopped, the available values of $e_p$ at all nodes is vector [e].

Where, $PSH_p$ and $QSH_p$ are real and reactive power injections scheduled/specified/set values, and $I_{1p}$ and $I_{2p}$ can take any values from $-\infty, \ldots, -2, -1, 0, +1, +2, \ldots, +\infty$. Normally they take the value of +1, however, their best possible values can be determined experimentally. In case of PV-nodes, $QSH_p$ takes the value of calculated $Q_p$ if it is within the upper and lower reactive power generation capability limits. It tales the value of upper reactive power generation capability limit, if calculated $Q_p$ is greater than or equal the upper limit, and it tales the value of lower reactive power generation capability limit, if calculated $Q_p$ is less than equal the lower limit.

The PDL model comprises equations (51) to (56), (10), (11), and (13), and turns out to be the simplest possible Loadflow computation model. The PDL method is expected to be two times more efficient than the current state-of-the-art and the prior art SSDL method.

Convergence

The iteration process is carried out until changes in the real and imaginary parts of the set of (n–1)-node voltages calculated in two consecutive iterations are all less than the specified tolerance $-\epsilon$, as shown in equations (10) and (11). The lower the value of the specified tolerance for convergence check, the greater the solution accuracy.

Scheduled or Specified Voltage at a PV-Node

Of the four variables, real power $PSH_p$ and voltage magnitude $VSH_p$ are scheduled/specified/set at a PV-node. If the reactive power $Q_p$ calculated using $VSH_p$ at the PV-node is within the upper and lower generation capability limits of a PV-node generator, it is capable of holding the specified voltage at its terminal. Therefore the imaginary component $f_p$ of complex voltage calculated by equation (51) by using actually calculated reactive power $Q_p$ in place of $QSH_p$ in (53), along with the latest available real component estimate of $e_p$ is adjusted to specified voltage magnitude by equation (13). Similarly, the real component $e_p$ of complex voltage calculated by equation (52) by using actually calculated reactive power $Q_p$ in place of $QSH_p$, along with the latest available imaginary component estimate of $f_p$ is adjusted to specified voltage magnitude by equation (13). However, in case of violation of upper or lower generation capability limits of a PV-node generator, a violated limit value is used for $QSH_p$ in (53) and (54), meaning a PV-node generator is no longer capable of holding its terminal voltage at its scheduled voltage $VSH_p$, and the PV-node is switched to a PQ-node type.

Schemes for the Solution of PDL Model

Solving first (51) for [f] and then (52) for [e] repeatedly constitutes an iteration scheme referred to as successive (1f, 1e) iteration scheme. Similarly, first solving (52) for [e] and then (51) for [f] repeatedly constitutes an iteration scheme referred to as successive (1e, 1f) iteration scheme. These schemes involve calculation of [RP] and [RQ] always using the most recent real and imaginary components of voltage values, and it is the block Gauss-Seidal approach. The schemes are block successive, which imparts increased stability to the solution process. This in turn improves convergence and increases the reliability of obtaining solution. Also, solving simultaneously (51) for [f] and (52) for [e] repeatedly constitutes an iteration scheme referred to as simultaneous (1f, 1e) iteration scheme. However, calculation steps for the solution of PDL model, constituting PDL method, are given in the following only for successive (1f, 1e) iteration scheme, from which calculation steps for other schemes become obvious.

Calculation Steps of Patel Decoupled Loadflow (PDL) Method

The steps of loadflow computation by PDL method are shown in the flowchart of FIG. 2b. Referring to the flowchart of FIG. 2b, different steps are elaborated in steps marked with similar numbers in the following. The words "Read system data" in Step-1 correspond to step-10 and step-20 in FIG. 3, and step-14, step-20, step-32, step-44, step-50 in FIG. 4. All other steps in the following correspond to step-30 in FIG. 3, and step-60, step-62, and step-64 in FIG. 4.

51. Read system data and assign an initial approximate solution. If better solution estimate is not available, set the real component of voltage at pv-nodes equal to specified voltage magnitudes and at PQ-nodes equal to 1.o p.u., and imaginary component at all nodes not equal to that of the slack-node, which is zero, but very low value close to zero.
52. Initialize iteration count ITRF=ITRE=r=0, maximum change in the imaginary and the real components of voltage over an iteration variables DFMX=DEMX=0.0, and storage vectors for the imaginary and real components of voltage of the previous iteration [f0]=[e0]=0.0
53. Form nodal admittance matrix. Form (m+k)×(m+k) size matrix [GB] using (55) and (56), factorize and store it in a compact storage exploiting sparsity. Storing factorized matrix is required if (51) & (52) are to be solved by forward-backward substitution. In case (51) & (52) are solved by Gauss-Seidel iteration scheme [GB] is not required to be stored in factorized form.
54. Compute the vector of modified residues [RP] using (53). Compute $Q_p$ for use as $QSH_p$ in calculating $RP_p$ using (53) at a PV-node after adjusting its latest available estimate of complex voltage for specified value by equation (13). If $Q_p$ is greater than the upper or less than the lower generation capability limits, the violated limit is used as $QSH_p$ in (53) and the node status is changed to PQ-node type.
55. Solve (51) for [f] by forward-backward substitution using stored factorized form of matrix [GB], or by Gauss-Seidel iteration using equation (57) for specified/set number of iterations or until local convergence of this sub-problem.
56. Adjust voltage magnitudes at all nodes having current status of PV-node types equal to the respective scheduled/specified/set voltage magnitude values using equation (13).
57. Increment iteration count ITRF=ITRF+1 and r=(ITRF+ITRE)/2, and perform DFMX=0.0
58. Calculate $|\Delta f_p^{(r+1)}|$ for all the nodes using (10), or calculate vector [Df]=absolute value of each component of the difference [f]−[f0] and determine maximum value component of [Df] as DFMX., and perform [f0]=[f]
59. If both DFMX and DEMX are less than or equal to specified convergence tolerance, go to step-66, otherwise follow the next step.
60. Compute the vector of modified residues [RQ] using (54). Compute $Q_p$ for use as $QSH_p$ in calculating $RQ_p$ using (54) at a PV-node after adjusting its latest available estimate of complex voltage for specified value by equation (13). If $Q_p$ is greater than the upper or less than the lower generation capability limits, the violated limit is used as $QSH_p$ in (54) and the node status is changed to PQ-node type.
61. Solve (52) for [e] by forward-backward substitution using stored factorized form of matrix [GB], or by Gauss-Seidel iteration using equation (58) for specified/set number of iterations or until local convergence of this sub-problem.
62. Adjust voltage magnitudes at all nodes having current status of PV-node types equal to the respective scheduled/specified/set voltage magnitude values using equation (13).
63. Increment iteration count ITRE=ITRE+1 and r=(ITRF+ITRE)/2, and perform DEMX=0.0
64. Calculate $|\Delta e_p^{(r+1)}|$ for all the nodes using (11), or calculate vector [De]=absolute value of each component of the difference [e]−[e0] and determine maximum value component of [De] as DEMX., and perform [e0]=[e]
65. If both DFMX and DEMX are not less than or equal to specified convergence tolerance, go to step-5, otherwise follow the next step.
66. From calculated values of the real and imaginary components of complex voltage at different power network nodes, and tap position of tap changing transformers, calculate power flows through power network components, and reactive power generation at PV-nodes.

General Statements

The system stores a representation of the reactive capability characteristic of each machine and these characteristics act as constraints on the reactive power, which can be calculated for each machine.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respect as illustrative and not restrictive, the scope of the invention being indicated by the appended claims in addition to the foregoing description, and all changes which come within the meaning and range of equivalency of the claims are therefore intended to be embraced therein.

REFERENCES

Foreign Patent Document

1. U.S. Pat. No. 4,868,410 dated Sep. 19, 1989: "System of Load Flow Calculation for Electric Power System"
2. U.S. Pat. No. 5,081,591 dated Jan. 14, 1992: "Optimizing Reactive Power Distribution in an Industrial Power Network"

Published Patent Documents

3. Canadian Patent Number: CA2107388 dated 9 Nov. 1993: "Method of Fast Super Decoupled Loadflow Computation for Electrical Power System"
4. International Patent Application Number: PCT/CA2003/001312 dated 29 Aug. 2003; "System of Super Super Decoupled Loadflow Calculation for Electrical Power System"
5. International Patent Application Number: PCT/CA2005/001537 dated 1 Oct. 2005: "System and Method of Parallel Loadflow Calculation for Electrical Power System"

Other Publications

6. Stagg G. W. and El-Abiad A. H., "Computer methods in Power System Analysis". McGrow-Hill, New York, 1968

7. S. B. Patel, "Fast Super Decoupled Loadflow", IEEE proceedings Part-C. Vol. 139, No. 1, pp. 13-20, January 1992
8. Suresh. B. Patel, "Super Super Decoupled Loadflow". Proceedings IEEE Toronto International Conference (TIC-STH-2009), pp. 652-659, September, 2009

The embodiments of the invention in which an exclusive property or privilege is claimed are defined as follows:

1. A method of forming/defining and solving a loadflow computation model of a power network to affect control of voltages and power flows in a power system, comprising the steps of:

obtaining on-line or simulated data of open/close status of all switches and circuit breakers in the power network, and reading data of operating limits of components of the power network including maximum power carrying capability limits of transmission lines, transformers, and PV-node, a generator-node where Real-Power-P and Voltage-Magnitude-V are given/assigned/specified/set, maximum and minimum reactive power generation capability limits of generators, and transformers tap position limits, obtaining on-line readings of given/assigned/specified/set Real-Power-P and Reactive-Power-Q at PQ-nodes, Real-Power-P and voltage-magnitude-V at PV-nodes, voltage magnitude and angle at a reference/slack node, and transformer turns ratios, wherein said on-line readings are the controlled variables/parameters, performing loadflow computation by forming and solving a loadflow model of the power network to calculate complex voltages or their real and imaginary components or voltage magnitude corrections and voltage angle corrections at the power network nodes providing for the calculation of power flowing through different network components, and reactive power generation at PV-nodes, and turns ratio of tap-changing transformers in dependence the set of said obtained-online readings, or given/scheduled/specified/set values of controlled variables/parameters and physical limits of operation of the power network components, forming and solving the said loadflow model of the power network referred to as Patel Decoupled Loadflow (PDL) model as characterized by equations, $$[RP] = [GB][f] \quad (51)$$

$$[RQ] = [GB][e] \quad (52)$$

wherein, each component of [RP], [RQ], and [GB] are defined by, $$RP_p = [(I_{1p}PSH_p + I_{2p}QSH_p)/f_p] - [I_{1p}(G_{pp} + g_p) - I_{2p}(B_{pp} + b_p)] \quad (53)$$

$$e_p^2/f_p - (e_p/f_p)\sum_{q>p}(I_{1p}G_{pq} - I_{2p}B_{pq})e_q +$$

$$(e_p/f_p)\sum_{q>p}(I_{2p}G_{pq} + I_{1p}B_{pq})f_q - \sum_{q>p}(I_{2p}G_{pq} + I_{1p}B_{pq})e_q$$

$$RQ_p = [(I_{1p}PSH_p + I_{2p}QSH_p)/e_p] - [I_{1p}(G_{pp} + g_p) - I_{2p}(B_{pp} + b_p)] \quad (54)$$

$$f_p^2/e_p - (f_p/e_p)\sum_{q>p}(I_{1p}G_{pq} - I_{2p}B_{pq})f_q -$$

$$(f_p/e_p)\sum_{q>p}(I_{2p}G_{pq} + I_{1p}B_{pq})e_q + \sum_{q>p}(I_{2p}G_{pq} + I_{1p}B_{pq})f_q$$

$$GB_{pq} = I_{1p}G_{pq} - I_{2p}B_{pq} \quad (55)$$

$$GB_{pp} = [I_{1p}(G_{pp} + g_p) - I_{2p}(B_{pp} + b_p)] \quad (56)$$

wherein, for solving each linearized sub-problem by Guass-Seidel method, equations (51) and (52) are written as equations (57) and (58) respectively, $$f_p^{(r+1)} = \left[ RP_p - \sum_{q=1}^{p-1} GB_{pq} f_q^{(r+1)} - \sum_{q=p+1}^{n} GB_{pq} f_q^{(r)} \right] / GB_{pp} \quad (57)$$

$$e_p^{(r+1)} = \left[ RQ_p - \sum_{q=1}^{p-1} GB_{pq} e_q^{(r+1)} - \sum_{q=p+1}^{n} GB_{pq} e_q^{(r)} \right] / GB_{pp} \quad (58)$$

wherein, $e_p$ and $f_p$ are the real and imaginary parts of the complex voltage $V_p$ of node-p, $PSH_p$ and $QSH_p$ are scheduled/specified/set values, except that $QSH_p$ at a PV-node is calculated value using specified voltage magnitude constrained by upper and lower reactive power generation capability limits of a PV-node generator, $G_{pq}$, $G_{pp}$, and $B_{pq}$, $B_{pq}$, are off-diagonal and diagonal elements of real and imaginary parts of the complex admittance matrix of the network respectively, and $g_p$, $b_p$ are real and imaginary components of network admittance shunts, q>p indicates node-q is the node adjacent directly connected to node-p excluding the case of q=p, n is the number of nodes in network, superscript 'r' indicates the iteration count, and factors $I_{1p}$ & $I_{2p}$ can take any values, both the same or different, to be determined experimentally for the best possible convergence and the values can be from $-\infty, \ldots, -2, -1, 0, 1, 2, \ldots, \infty$, evaluating loadflow computation for any over loaded components of the power network and for under/over voltage at any of the nodes of the power network, correcting one or more controlled variables/parameters and repeating the performing loadflow computation, evaluating, and correcting steps until evaluating step finds no over loaded components and no under/over voltages in the power network, and affecting a change in power flow through components the power network and voltage magnitudes and angles at the nodes of the power network by actually implementing the finally obtained values of controlled variables/parameters after evaluating step finds a good power system or stated alternatively the power network without any overloaded components and under/over voltages, which finally obtained controlled variables/parameters however are stored for acting upon fast in case a simulated event actually occurs.

2. A method of forming/defining and solving a loadflow computation model of a power network to affect control of voltages and power flows in a power system, comprising the steps of:

obtaining on-line or simulated data of open/close status of all switches and circuit breakers in the power network, and reading data of operating limits of components of the power network including maximum power carrying capability limits of transmission lines, transformers, and PV-node, a generator-node where Real-Power-P and Voltage-Magnitude-V are given/assigned/specified/set, maximum and minimum reactive power generation capability limits of generators, and transformers tap position limits, obtaining on-line readings of given/assigned/specified/set Real-Power-P and Reactive-Power-Q at PQ-nodes, Real-Power-P and voltage-magnitude-V at PV-nodes, voltage magnitude and angle at a reference/slack node, and transformer turns ratios, wherein said on-line readings are the controlled variables/parameters, performing loadflow computation by forming and solving a loadflow model of the power network to calculate complex voltages or their real and imaginary components or voltage magnitude corrections and voltage angle corrections at the power network nodes providing for the calculation of power flowing through different network components, and reactive power generation at PV-nodes, and turns ratio of tap-changing transformers in dependence the set of said obtained-online readings, or given/scheduled/specified/set values of controlled variables/parameters and physical limits of operation of the power network components, forming and solving the said loadflow model of the power network referred to as Decoupled Gauss-Seidel-Patel Loadflow (DGSPL) model as characterized by equations, $$I_{1p}PSH_p + I_{2p}QSH_p = A_p(e_p^2 + f_p^2) + \quad (32)$$
$$e_p\sum_{q>p}(I_{1p}BB1_p - I_{2p}BB2_p) + f_p\sum_{q>p}(I_{2p}BB1_p + I_{1p}BB2_p)$$

Where, $$A_p = I_{1p}(G_{pp} + g_p) - I_{2p}(B_{pp} + b_p) \quad (33)$$

$$BB1_p = (e_q G_{pq} - f_q B_{pq}) \quad (34)$$

$$BB2_p = (f_q G_{pq} + e_q B_{pq}) \quad (35)$$

now, equation (32) can be decoupled into two quadratic equations as, $$A_{1p}e_p^2 + B_{1p}e_p + C_{1p} = 0 \quad (36)$$

$$A_{2p}f_p^2 + B_{2p}f_p + C_{2p} = 0 \quad (37)$$

Where, $$A_{1p} = A_{2p} = A_p \quad (38)$$

$$B_{1p} = \sum_{q>p}(I_{1p}BB1_p - I_{2p}BB2_p) \quad (39)$$

$$B_{2p} = \sum_{q>p}(I_{2p}BB1_p + I_{1p}BB2_p) \quad (40)$$

$$C_{1p} = A_{2p}f_p^2 + B_{2p}f_p - (I_{1p}PSH_p + I_{2p}QSH_p) \quad (41)$$

$$C_{2p} = A_{1p}e_p^2 + B_{1p}e_p - (I_{1p}PSH_p + I_{2p}QSH_p) \quad (42)$$

where, $PSH_p$ and $QSH_p$ are scheduled or specified values, except that $QSH_p$ at a PV-node is calculated value using specified voltage magnitude constrained by upper and lower reactive power generation capability limits of a PV-node generator, and equations (36) and (37) can be iterated incorporating self-iteration for solution as, $$(e_p^{(sr+1)})^{(r+1)} = [\{-C_{1p}/((e_p)^{sr})^r\} - (B_{1p})^r]/A_{1p} \quad (43)$$

$$(f_p^{(sr+1)})^{(r+1)} = [\{-C_{2p}/((f_p)^{sr})^r\} - (B_{2p})^r]/A_{2p} \quad (44)$$

and also equations (36) and (37), which are quadratic in $e_p$ and $f_p$, can also be iterated without incorporating self-iteration for solution as, $$e_p^{(r+1)} = (-B_{1p}^r + SQRT((B_{1p}^r)^2 - 4A_{1p}C_{1p}))/2A_1 \quad (45)$$

$$f_p^{(r+1)} = (-B_{2p}^r + SQRT((B_{2p}^r)^2 - 4A_{2p}C_{2p}))/2A_2 \quad (46)$$

wherein, the words SQRT means take square root of the expression enclosed in parenthesis immediately following words SQRT, equations (36), (43) or (45) and (37), (44) or (46) can be solved simultaneously or successively, and successive mode either first (36), (43) or (45) and, then (37), (44) or (46) or first (37), (44) or (46) and, then (36), (43) or (45) are solved alternately, and further $e_p^{(r+1)}$ and $f_p^{(r+1)}$ values calculated by (43) or (45) and (44) or (46) are modified as, $$e_p^{(r+1)} = e_p^r + \beta\Delta e_p^{(r+1)} \quad (47)$$

$$f_p^{(r+1)} = f_p^r + \beta\Delta f_p^{(r+1)} \quad (48)$$

Where, $$\Delta e_p^{(r+1)} = e_p^{(r+1)} - e_p^r \quad (49)$$

$$\Delta f_p^{(r+1)} = f_p^{(r+1)} - f_p^r \quad (50)$$

and β is an acceleration factor used to speed-up the convergence, and $\Delta e_p^{(r+1)}$ and $\Delta f_p^{(r+1)}$ are the corrections in the real and imaginary parts of the voltage at node-p in the (r+1)th iteration, and wherein, $e_p$ and $f_p$ are real and imaginary parts of complex voltage at node-p, $G_{pq}$, $G_{pp}$, and $B_{pq}$, $B_{pp}$ are off-diagonal and diagonal elements of real and imaginary parts of the complex admittance matrix of the network respectively, and $g_p$, $b_p$ are real and imaginary components of network admittance shunts, r is iteration count, and factors $I_{1p}$ & $I_{2p}$ can take any values, both the same or different, to be determined experimentally for the best possible convergence and the values can be from $-\infty, \ldots, -2, -1, 0, 1, 2, \ldots, \infty$, evaluating loadflow computation for any over loaded components of the power network and for under/over voltage at any of the nodes of the power network, correcting one or more controlled variables/parameters and repeating the performing loadflow computation, evaluating, and correcting steps until evaluating step finds no over loaded components and no under/over voltages in the power network, and affecting a change in power flow through components the power network and voltage magnitudes and angles at the nodes of the power network by actually implementing the finally obtained values of controlled variables/parameters after evaluating step finds a good power system or stated alternatively the power network without any overloaded components and under/over voltages, which finally obtained controlled variables/parameters however are stored for acting upon fast in case a simulated event actually occurs.

3. The method of forming/defining and solving a loadflow computation model of a power network to affect control of voltages and power flows in a power system as defined in claim 1 is the method that organizes a set of nonlinear algebraic equations in linear form as a product of coefficient matrix and unknown vector on one side of the matrix equation and all the other terms on the other side as known vector, and then solving the linear matrix equation for unknown vector in an iterative fashion.

* * * * *